United States Patent
Jin et al.

(10) Patent No.: US 11,853,120 B2
(45) Date of Patent: Dec. 26, 2023

(54) FOLDABLE TERMINAL AND SCREEN-ON CONTROL METHOD FOR FOLDABLE TERMINAL

(71) Applicant: Huawei Technologies Co., Ltd., Shenzhen (CN)

(72) Inventors: Qinghao Jin, Shenzhen (CN); Hung-Yi Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 688 days.

(21) Appl. No.: 16/996,997

(22) Filed: Aug. 19, 2020

(65) Prior Publication Data

US 2020/0379511 A1    Dec. 3, 2020

Related U.S. Application Data

(63) Continuation of application No. PCT/CN2019/116104, filed on Nov. 6, 2019.

(30) Foreign Application Priority Data

Feb. 22, 2019    (CN) .......................... 201910135164.8

(51) Int. Cl.
    *G06F 1/16*    (2006.01)
    *H04L 12/00*    (2006.01)
(52) U.S. Cl.
    CPC .......... *G06F 1/1618* (2013.01); *G06F 1/1626* (2013.01); *G06F 1/1632* (2013.01);
    (Continued)
(58) Field of Classification Search
    CPC .... G06F 1/1618; G06F 1/1626; G06F 1/1632; G06F 1/1684; H04L 12/00
    (Continued)

(56) References Cited

U.S. PATENT DOCUMENTS 8,385,063 B2 *    2/2013    Zhu ..................... H04M 1/0237
                                                             345/169
8,868,931 B2    10/2014    Little et al.
(Continued)

FOREIGN PATENT DOCUMENTS

CN    103475760 A    12/2013
CN    203524031 U    4/2014
(Continued)

OTHER PUBLICATIONS

Xu Jianghua Protective jacket of mobile terminal Apr. 9, 2014 Dongguan Yulong Comm Tech Co; Yulong Comp Comm Tech Shenzhen paragraphs paragrph 27-40 English.*

(Continued)

*Primary Examiner* — Prabodh M Dharia
(74) *Attorney, Agent, or Firm* — Conley Rose, P.C.

(57) ABSTRACT

A foldable terminal and a screen-on control method for the foldable terminal, where the foldable terminal includes a body, a display component, a processor, and a covering detection sensor. The body includes a first body part and a second body part that are connected in a foldable connection manner, the display component includes two display parts. The covering detection sensor is configured to detect whether the first body part is covered with a terminal protective case. The processor is configured to control a to-be-used display part to be completely or partially on when the covering detection sensor detects that the first body part is not covered with the terminal protective case.

20 Claims, 21 Drawing Sheets

(52) U.S. Cl.
CPC ............ *G06F 1/1684* (2013.01); *H04L 12/00* (2013.01); *G06F 2200/1633* (2013.01)

(58) Field of Classification Search
USPC .......................... 345/173, 418, 169; 710/15
See application file for complete search history.

(56) References Cited

U.S. PATENT DOCUMENTS

| | | | |
|---|---|---|---|
| 2008/0074400 A1 | 3/2008 | Gettemy et al. | |
| 2013/0076614 A1* | 3/2013 | Ive | H04M 1/0283 710/15 |
| 2014/0247229 A1* | 9/2014 | Cho | G06F 1/1652 345/173 |
| 2014/0268517 A1 | 9/2014 | Moon et al. | |
| 2015/0198978 A1 | 7/2015 | Catchpole | |
| 2015/0264164 A1 | 9/2015 | Cha | |
| 2015/0338888 A1 | 11/2015 | Kim et al. | |
| 2016/0170448 A1 | 6/2016 | Michino | |
| 2017/0357292 A1* | 12/2017 | Cho | H04M 1/0216 |
| 2018/0129250 A1 | 5/2018 | La et al. | |
| 2018/0210515 A1* | 7/2018 | Lyles | G06F 1/1656 |
| 2018/0213902 A1 | 8/2018 | Lim | |
| 2018/0232191 A1* | 8/2018 | Becze | G06F 3/04845 |
| 2018/0329580 A1* | 11/2018 | Aurongzeb | G09G 3/035 |
| 2020/0037716 A1 | 2/2020 | Lim | |

FOREIGN PATENT DOCUMENTS

| | | |
|---|---|---|
| CN | 104053326 A | 9/2014 |
| CN | 104798361 A | 7/2015 |
| CN | 104918446 A | 9/2015 |
| CN | 106484351 A | 3/2017 |
| CN | 107103840 A | 8/2017 |
| CN | 107113389 A | 8/2017 |
| CN | 107920642 A | 4/2018 |
| CN | 108206869 A | 6/2018 |
| CN | 108600431 A | 9/2018 |
| WO | 2018080116 A1 | 5/2018 |

OTHER PUBLICATIONS

Xu Jianghua Protective jacket of mobile terminal Apr. 9, 2014 Dongguan Yulong Comm Tech Co; Yulong Comp Comm Tech Shenzhen paragraphs paragrph 27-40 ; Figures 1-3 Chinese.*

* cited by examiner

FOLDABLE TERMINAL AND SCREEN-ON CONTROL METHOD FOR FOLDABLE TERMINAL

CROSS-REFERENCE TO RELATED APPLICATIONS

This application is a continuation of International Patent Application No. PCT/CN2019/116104 filed on Nov. 6, 2019, which claims priority to Chinese Patent Application No. 201910135164.8 filed on Feb. 22, 2019. The disclosures of the aforementioned applications are hereby incorporated by reference in their entireties.

TECHNICAL FIELD

This application relates to the field of electronic device technologies, and in particular, to a foldable terminal and a screen-on control method for the foldable terminal.

BACKGROUND

With development of science and technology and growing requirements of people, terminals are more diversified in form. For example, a foldable terminal emerges on the market currently. A display component of the foldable terminal includes two display parts, and it is convenient to fold and unfold the foldable terminal. When a mobile phone is in a fully folded state, the two display parts face opposite directions, and a user may use either of the display parts. When the mobile phone is in an unfolded state, the user may use the two display parts at the same time. Similar to a non-foldable terminal, a foldable terminal is usually protected using a terminal protective case, to reduce possible physical damages of the foldable terminal.

A terminal protective case used in the related art is a drawer-like protective case. When a foldable terminal is not used, the foldable terminal is folded and put into the drawer-like protective case. When the foldable terminal needs to be used, the foldable terminal is pulled out from the drawer-like protective case. The drawer-like protective case reduces possible physical damages of the foldable terminal to some extent.

Other approaches have at least the following problem. When a user wants to use the foldable terminal, the user needs to first pull out the foldable terminal from the draw-like protective case, manually press a button to turn on a corresponding display part, and then can use the foldable terminal. Such an operation process is relatively complex, and operation efficiency is low.

SUMMARY

To resolve a technical problem in the related art, embodiments of this application provide a foldable terminal and a screen-on control method for the foldable terminal.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in a folded state, control, if the covering detection sensor 4 detects that the first body part 101 is not covered with the terminal protective case, a to-be-used display part in the two display parts to be completely or partially on, where the to-be-used display part is a display part predicted based on status data of a user and/or an operation instruction entered by the user.

When the foldable terminal is in a fully folded state, the two display parts face opposite directions. The foldable terminal may be a dual-display foldable mobile phone, the first body part 101 and the second body part 102 may be hinged, and a display is disposed on each of the first body part 101 and the second body part 102. The foldable terminal may alternatively be a flexible-display foldable mobile phone.

The display component 2 may be a flexible display (for example, when the foldable terminal is a flexible-display foldable mobile phone), or may be two displays (for example, when the foldable terminal is a dual-display foldable mobile phone).

The status data of the user may be image data of the user. The operation instruction entered by the user may be a voice instruction of the user, a touch instruction of the user, or a specific action instruction implemented by the user for operating the foldable terminal.

The to-be-used display part is a display part that is to be used by the user and that is predicted by the processor 3 based on data detected by sensors. The sensors may include one or more of sensors such as a gravity sensor, a gyroscope sensor, an acceleration sensor, a touch recognition sensor, a camera, or a microphone. The processor 3 may predict the to-be-used display part of the foldable terminal based on the data detected by the sensors.

A camera is used as an example. The processor obtains images photographed by cameras installed on body parts, and performs face detection on the images. When a face image is in an image photographed by a camera disposed on a body part, and a proportion of the face image in the entire image reaches a preset threshold, it is determined that a display part that belongs to a same body part as the camera is the to-be-used display part.

That the body part is covered with the terminal protective case means that the terminal protective case and the body part are close enough. Whether they are close enough may be determined through magnetic field strength detection or light intensity detection, or in another manner. The covering detection sensor 4 may be configured to implement detection such as magnetic field strength detection or light intensity detection. When a magnetic field strength detected by the covering detection sensor 4 is greater than a preset magnetic field strength threshold or a light intensity value is less than a preset light intensity threshold, the processor 3 determines that the body part on which the covering detection sensor 4 is located is covered with the terminal protective case. When the magnetic field strength detected by the covering detection sensor 4 is less than the preset magnetic field strength threshold or the light intensity value is greater than the preset light intensity threshold, the processor 3 determines that the body part on which the covering detection sensor 4 is located is not covered with the terminal protective case.

The covering detection sensor 4 may be an inductive sensor. Correspondingly, the terminal protective case installed on the foldable terminal needs to be provided with a detected device, and the detected device is a magnetic device. In this case, the covering detection sensor 4 can determine a distance from the detected device to the covering detection sensor 4 based on different sensed magnetic field strengths, to determine whether the foldable terminal is covered with the terminal protective case. The covering detection sensor 4 may alternatively be a photoelectric proximity sensor. In this case, the covering detection sensor 4 can determine a distance from the detected device to the covering detection sensor 4 based on different sensed light intensities, to determine whether the foldable terminal is covered with the terminal protective case.

Both the covering detection sensor 4 and the display component 2 are electrically connected to the processor 3.

That the foldable terminal is in a folded state means that an included angle between the first body part 101 and the second body part 102 is less than a preset angle threshold. That the foldable terminal is in an unfolded state means that the included angle between the first body part 101 and the second body part 102 is greater than the preset angle threshold. An angle sensor 5 may be used to detect the angle between the first body part 101 and the second body part 102. The angle sensor 5 is electrically connected to the processor 3, and the angle sensor 5 is configured to detect an angle value of the included angle between the two body parts, and send the detected angle value to the processor 3. When the angle value that is received by the processor 3 from the angle sensor 5 is greater than the preset angle threshold, it is determined that the body 1 is in an unfolded state. When the angle value that is received by the processor 3 from the angle sensor 5 is less than the preset angle threshold, it is determined that the body 1 is in a folded state.

The preset angle threshold may be set based on people's operation habit. Optionally, the preset angle threshold may be 180°. When the angle value that is received by the processor 3 from the angle sensor 5 is less than 180°, it is determined that the body 1 is in a folded state. When the angle value that is received by the processor 3 from the angle sensor 5 is equal to 180°, it is determined that the body 1 is in an unfolded state. That is, for the body 1, only a fully unfolded state is determined as an unfolded state, and remaining states are all determined as folded states. Optionally, the preset angle threshold may alternatively be 0°. When the angle value that is received by the processor 3 from the angle sensor 5 is equal to 0°, it is determined that the body 1 is in a folded state. When the angle value that is received by the processor 3 from the angle sensor 5 is greater than 0°, it is determined that the body 1 is in an unfolded state. That is, for the body 1, only a fully folded state is determined as a folded state, and remaining states are all determined as unfolded states.

In the solution described in this embodiment of this application, the foldable terminal may come with a terminal protective case, or the user may install a purchased terminal protective case on the foldable terminal. That the user installs a purchased terminal protective case on the foldable terminal is used as an example. When the user does not need to use the foldable terminal, the user may fold the foldable terminal, and cover the foldable terminal with the terminal protective case. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

When the body 1 is in a folded state, people want to use one display part of the foldable terminal for display in most cases. Therefore, subsequently the processor 3 further needs to determine a display part to be used by the user. In addition, only the determined to-be-used display part can be on, and a display part not to be used is not on. The foldable terminal may use a method, such as gravity sensing, gyroscope sensing, acceleration detection, touch recognition, and face recognition, to detect the display part to be used by the user.

When the body 1 is in an unfolded state, based on people's actual use habit, people want to use the two display parts (that is, the entire display component 2) of the foldable terminal for display in most cases. Therefore, there is no need to determine a to-be-used display part of the foldable terminal, or it is considered by default that the two display parts are both to-be-used display parts of the foldable terminal.

The terminal protective case installed on the foldable terminal needs to include at least three parts: a first cover surface part, a second cover surface part, and a flexible connection surface part used for bending. The first cover surface part is connected to the second cover surface part through the flexible connection surface part.

In an application, an installation manner of the terminal protective case is related to a location at which the covering detection sensor 4 is disposed. Assuming that the covering detection sensor 4 is disposed on the first body part 101, an optional installation manner is A sidewall of the second cover surface part of the terminal protective case is fixedly installed on the body 1, but the first cover surface part is not fastened to the body 1. That is, one side of the terminal protective case 6 is fixedly installed on the body 1. In addition, when the terminal protective case fully covers the foldable terminal, the first cover surface part covers the first body part 101, the second cover surface part covers the second body part 102, and the flexible connection surface part covers a foldable part of the body 1. In such an installation manner, the first cover surface part can be separately uncovered, but the first cover surface part needs to be uncovered if the second cover surface part is to be uncovered. Therefore, when the to-be-used display part is located on the second body part 102 and the covering detection sensor 4 disposed on the first body part 101 detects that the first body part 101 is not covered with the terminal protective case 6, it may be considered that the second body part 102 is not covered with the terminal protective case either.

For example, the covering detection sensor 4 is disposed on the first body part 101 and one side of the terminal protective case is fixedly installed on the foldable terminal. It is assumed that the determined to-be-used display part is located on the first body part 101. When the covering detection sensor 4 disposed on the first body part 101 detects that the first body part 101 is not covered with the terminal protective case, the processor 3 controls the display part located on the first body part 101 to be on.

It is assumed that the determined to-be-used display part is located on the second body part 102. When the covering detection sensor 4 disposed on the first body part 101 detects that the first body part 101 is not covered with the terminal protective case, it is considered by default that the second body part 102 is not covered with the terminal protective case either. In this case, the processor 3 controls the display part disposed on the second body part 102 to be on.

In a possible implementation, the controlling, if the covering detection sensor 4 detects that the first body part 101 is not covered with the terminal protective case, a to-be-used display part in the two display parts to be completely or partially on includes if the to-be-used display part is located on the first body part 101 and the covering detection sensor 4 detects that the first body part 101 is not covered with the terminal protective case, controlling the to-be-used display part to be on.

An embodiment of this application provides a foldable terminal. The foldable terminal includes a body 1, a display component 2, and a processor 3. The body 1 includes a first body part 101 and a second body part 102 that are connected in a foldable connection manner. The display component 2 includes two display parts, and the two display parts are fastened on the different body parts. The processor 3 is configured to when the body 1 is in a folded state, if a to-be-used display part of the foldable terminal is located on the second body part 102, control the to-be-used display part to be on when receiving a screen-on instruction entered by a user, where the to-be-used display part is a display part predicted based on status data of the user and/or an operation instruction entered by the user.

In the solution described in this embodiment of this application, when the predicted to-be-used display part is located on the second body part 102, because the second body part 102 is not provided with a covering detection sensor 4, whether the second body part 102 is covered with a terminal protective case cannot be accurately determined. In this case, the user can turn on the to-be-used display part only after performing a specific operation, for example, making a specific gesture or pressing a specific button. In this way, the display part of the foldable terminal is on more accurately.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in an unfolded state, if the covering detection sensor 4 detects that the first body part 101 is not covered with the terminal protective case, control the display component 2 to be on.

In the solution described in this embodiment of this application, for example, the covering detection sensor 4 is disposed on the first body part 101 and one side of the terminal protective case is fixedly installed on the foldable terminal. When the body 1 is in an unfolded state and the covering detection sensor 4 disposed on the first body part 101 detects that the first body part 101 is not covered with the terminal protective case, it is considered by default that the second body part 102 is not covered with the terminal protective case either. In this case, the processor 3 controls the display component 2 to be on, that is, controls the two display parts to be both on.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in a folded state, if the covering detection sensor 4 detects that the first body part 101 is covered with the terminal protective case, control a preset partial area in a to-be-used display part of the foldable terminal to be on, where the to-be-used display part is a display part predicted based on status data of a user and/or an operation instruction entered by the user, and the preset partial area is an area, corresponding to a transparent area of the terminal protective case, in the to-be-used display part.

In the solution described in this embodiment of this application, for example, the covering detection sensor 4 is disposed on the first body part 101 and one side of the terminal protective case is fixedly installed on the foldable terminal. When the body 1 is in a folded state and the determined display part is located on the first body part 101, if the covering detection sensor 4 disposed on the first body part 101 detects that the first body part 101 is covered with the terminal protective case, the processor 3 controls a preset partial area in the display part located on the first body part 101 to be on.

When the body 1 is in a folded state and the determined display part is disposed on the second body part 102, if the covering detection sensor 4 disposed on the first body part 101 detects that the first body part 101 is covered with the terminal protective case, the second body part 102 is also definitely covered with the terminal protective case in a normal state. In this case, the processor 3 controls a preset partial area in the display part disposed on the second body part 102 to be on.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in an unfolded state, if the covering detection sensor 4 detects that the first body part 101 is covered with the terminal protective case, control a partial area, corresponding to a transparent area of the terminal protective case, in the two display parts to be on.

In the solution described in this embodiment of this application, for example, the covering detection sensor 4 is disposed on the first body part 101 and one side of the terminal protective case is fixedly installed on the foldable terminal. When the body 1 is in an unfolded state and the covering detection sensor 4 disposed on the first body part 101 detects that the first body part 101 is covered with the terminal protective case, the second body part 102 is also definitely covered with the terminal protective case in a normal state. In this case, the processor 3 controls a preset partial area in a preset display part to be on.

In a possible implementation, the display component 2 is a flexible display, or the two display parts of the display component 2 are two independent displays.

In a possible implementation, the foldable terminal further includes the terminal protective case 6. The terminal protective case 6 includes a first cover surface part 601, a second cover surface part 602, and a flexible connection surface part 603. The first cover surface part 601 is connected to the second cover surface part 602 through the flexible connection surface part 603. A detected device 7 adapted to the covering detection sensor 4 is disposed on the first cover surface part 601. The first cover surface part 601 is configured to cover a surface, facing an outer side of the body 1 when the body 1 is in a folded state, of the first body part 101. The second cover surface part 602 is configured to cover a surface, facing the outer side of the body 1 when the body 1 is in a folded state, of the second body part 102. The detecting whether the first body part 101 is covered with a terminal protective case includes determining, by detecting the detected device 7, whether the first body part 101 is covered with the terminal protective case.

The flexible connection surface part 603 is bendable, and the flexible connection surface part 603 is made of a flexible material. The first cover surface part 601 and the second cover surface part 602 may be made of flexible materials, or may be made of inflexible materials.

A transparent area may be disposed on the first cover surface part 601 and the second cover surface part 602 such that display content of the foldable terminal can be observed through the transparent area without uncovering the terminal protective case 6, and a corresponding operation can be performed.

In the solution described in this embodiment of this application, when a user does not need to use the foldable terminal, the user may fold the foldable terminal, and cover the foldable terminal with the terminal protective case 6. When the user needs to use the foldable terminal in a folded state, the processor 3 predicts a to-be-used display part of the foldable terminal based on status data of the user and/or an operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case 6 is uncovered, the processor 3 may control the to-be-used display part to directly display a specified interface, for example, a photographing interface.

A sidewall of the second cover surface part 602 of the terminal protective case 6 is fastened to the body 1, but the first cover surface part 601 is not fastened to the body 1. That is, one side of the terminal protective case 6 is fixedly installed on the body 1. Optionally, the terminal protective case 6 is clamped to the body 1. To be specific, the sidewall of the second cover surface part 602 is clamped to the body 1. One side of the second cover surface part 602 of the terminal protective case 6 is fixedly installed on the body 1. In this case, the first cover surface part 601 can be separately uncovered, but the first cover surface part 601 needs to be uncovered if the second cover surface part 602 is to be uncovered. Therefore, when the to-be-used display part is located on the second body part 102 and the covering detection sensor 4 disposed on the first body part 101 detects that the first body part 101 is not covered with the terminal protective case 6, it may be considered that the second body part 102 is not covered with the terminal protective case 6 either.

In actual application, the foldable terminal has two states a folded state and an unfolded state. In the two different states, a process of controlling, by the processor 3, the display part to be on is as follows.

When an angle value detected by an angle sensor 5 is less than a preset angle threshold, the processor 3 determines that the foldable terminal is currently in a folded state.

It is assumed that the detected to-be-used display part is located on the first body part 101. When the covering detection sensor 4 disposed on the first body part 101 detects that the first body part 101 is not covered with the terminal protective case 6, the processor 3 controls the display part located on the first body part 101 to be on, and controls the other display part not to be on. When the covering detection sensor 4 disposed on the first body part 101 detects that the first body part 101 is covered with the terminal protective case 6, the processor 3 controls a preset partial area in the display part located on the first body part 101 to be on.

It is assumed that the detected to-be-used display part is located on the second body part 102. When the covering detection sensor 4 disposed on the first body part 101 detects that the first body part 101 is not covered with the terminal protective case 6, it is considered by default that the second body part 102 is not covered with the terminal protective case 6 either. In this case, the processor 3 controls the display part disposed on the second body part 102 to be on, and controls the other display part not to be on. When the covering detection sensor 4 disposed on the first body part 101 detects that the first body part 101 is covered with the terminal protective case 6, the second body part 102 is also definitely covered with the terminal protective case 6 in a normal state. In this case, the processor 3 controls a preset partial area in the display part disposed on the second body part 102 to be on.

When the angle value detected by the angle sensor 5 is greater than the preset angle threshold, the processor 3 determines that the body 1 is in an unfolded state.

When the covering detection sensor 4 disposed on the first body part 101 detects that the first body part 101 is covered with the terminal protective case 6, the second body part 102 is also definitely covered with the terminal protective case 6 in a normal state. In this case, the processor 3 controls a preset partial area in a preset display part to be on.

When the covering detection sensor 4 disposed on the first body part 101 detects that the first body part 101 is not covered with the terminal protective case 6, it is considered by default that the second body part 102 is not covered with the terminal protective case 6 either. In this case, the processor 3 controls the display component 2 to be on, that is, controls the two display parts to be both on.

In a possible implementation, the sidewall of the second cover surface part 602 is fastened to an edge of the second body part 102.

In the solution described in this embodiment of this application, a direction in which the terminal protective case 6 is uncovered is the same as a direction in which the foldable terminal is unfolded. This conforms to a user operation habit better. The second cover surface part 602 may be clamped or adhered to the second body part 102.

In a possible implementation, the sidewall of the second cover surface part 602 is fastened to an edge of the first body part 101.

In the solution described in this embodiment of this application, a direction in which the terminal protective case 6 is uncovered is opposite to a direction in which the foldable terminal is unfolded. In such an installation manner, the edges of the first body part 101 and the second body part 102 are also covered with the terminal protective case 6 such that the foldable terminal is better protected. The second cover surface part 602 may be clamped or adhered to the first body part 101.

An embodiment of this application provides a foldable terminal. The foldable terminal includes a body 1, a display component 2, a processor 3, and two covering detection sensors 4. The body 1 includes a first body part 101 and a second body part 102 that are connected in a foldable connection manner. The display component 2 includes two display parts, and the two display parts are fastened on the different body parts. The two covering detection sensors 4 are respectively disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in a folded state, if a covering detection sensor 4 on a body part on which a to-be-used display part of the foldable terminal is located detects that the body part is not covered with the terminal protective case, control the to-be-used display part to be on, where the to-be-used display part is a display part predicted based on status data of a user and/or an operation instruction entered by the user.

In the solution described in this embodiment of this application, the terminal protective case may be installed on the foldable terminal provided in this embodiment of this application. When the user does not need to use the foldable terminal, the user may fold the foldable terminal, and cover the foldable terminal with the terminal protective case. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case is uncovered, the processor 3 may control the to-be-used display part to directly display a specified interface, for example, a photographing interface.

In actual application, the covering detection sensors 4 are disposed on both the first body part 101 and the second body part 102, and the terminal protective case with two sides easily opened may be fixedly installed on the foldable terminal. In such an installation manner, both a first cover surface part and a second cover surface part can be separately uncovered. In addition, when the terminal protective case fully covers the foldable terminal, the first cover surface part covers the first body part, the second cover surface part covers the second body part, and a flexible connection surface part covers a foldable part of the body 1.

An embodiment of this application provides a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in a folded state, if a covering detection sensor 4 on a body part on which a to-be-used display part of the foldable terminal is located detects that the body part is covered with the terminal protective case, control a partial area, corresponding to a transparent area of the terminal protective case, in the to-be-used display part to be on, where the to-be-used display part is a display part predicted based on status data of a user and/or an operation instruction entered by the user.

In the solution described in this embodiment of this application, for example, the terminal protective case with two sides easily opened is fixedly installed on the foldable terminal. It is assumed that the detected to-be-used display part is located on the first body part 101. When the covering detection sensor 4 disposed on the first body part 101 detects that the first body part 101 is not covered with the terminal protective case, the processor 3 controls the display part located on the first body part 101 to be on, and controls the other display part not to be on. When the covering detection sensor 4 disposed on the first body part 101 detects that the first body part 101 is covered with the terminal protective case, the processor 3 controls a preset partial area in the display part located on the first body part 101 to be on. The display part located on the second body part 102 always keeps screen-off, regardless of a detection result of the covering detection sensor 4 disposed on the second body part 102.

It is assumed that the detected to-be-used display part is located on the second body part 102. When the covering detection sensor 4 disposed on the second body part 102 detects that the second body part 102 is not covered with the terminal protective case, the processor 3 controls the display part located on the second body part 102 to be on, and controls the other display part not to be on. When the covering detection sensor 4 disposed on the second body part 102 detects that the second body part 102 is covered with the terminal protective case, the processor 3 controls a preset partial area in the display part located on the second body part 102 to be on. The display part located on the first body part 101 always keeps screen-off, regardless of a detection result of the covering detection sensor 4 disposed on the first body part 101.

An embodiment of this application provides a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in an unfolded state, if both of the covering detection sensors 4 disposed on the two body parts respectively detect that the body parts are not covered with the terminal protective case, control the display component 2 to be on.

In the solution described in the disclosed embodiment, when both of the covering detection sensors 4 disposed on the first body part 101 and the second body part 102 detect that the body 1 is not covered with the terminal protective case, the processor 3 controls the display component 2 to be on, that is, controls the two display parts to be both on.

An embodiment of this application provides a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in an unfolded state, if both of the covering detection sensors 4 disposed on the two body parts respectively detect that the body parts are covered with the terminal protective case, control a partial area, corresponding to a transparent area of the terminal protective case, in the two display parts to be on.

In the solution described in the disclosed embodiment, when both of the covering detection sensors 4 disposed on the first body part 101 and the second body part 102 detect that the body 1 is covered with the terminal protective case, the processor 3 controls a preset partial area in a preset display part to be on.

An embodiment of this application provides a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in an unfolded state, if only one of the covering detection sensors 4 disposed on the two body parts detects that a body part on which the covering detection sensor 4 is located is covered with the terminal protective case, control a display part on a body part that is not covered with the terminal protective case to be on.

In the solution described in the disclosed embodiment, when the covering detection sensor 4 disposed on the first body part 101 detects that the first body part 101 is covered with the terminal protective case and the covering detection sensor 4 disposed on the second body part 102 detects that the second body part 102 is not covered with the terminal protective case, the processor 3 controls the display part located on the second body part 102 to be on, and controls the display part located on the first body part 101 not to be on.

When the covering detection sensor 4 disposed on the second body part 102 detects that the second body part 102 is covered with the terminal protective case and the covering detection sensor 4 disposed on the first body part 101 detects that the first body part 101 is not covered with the terminal protective case, the processor 3 controls the display part located on the first body part 101 to be on, and controls the display part located on the second body part 102 not to be on.

In a possible implementation, the foldable terminal further includes the terminal protective case 6. The terminal protective case 6 includes a first cover surface part 601, a second cover surface part 602, and a flexible connection surface part 603. The first cover surface part 601 is connected to the second cover surface part 602 through the flexible connection surface part 603. A detected device 7 adapted to the covering detection sensor 4 on the first body part 101 is disposed on the first cover surface part 601. A detected device 7 adapted to the covering detection sensor 4 on the second body part 102 is disposed on the second cover surface part 602. The first cover surface part 601 is configured to cover a surface, facing an outer side of the body 1 when the body 1 is in a folded state, of the first body part 101. The second cover surface part 602 is configured to cover a surface, facing the outer side of the body 1 when the body 1 is in a folded state, of the second body part 102. The detecting whether the first body part 101 is covered with a terminal protective case includes determining, by detecting the detected device 7 disposed on the first cover surface part 601, whether the first body part 101 is covered with the terminal protective case. The detecting whether the second body part 102 is covered with a terminal protective case includes determining, by detecting the detected device 7 disposed on the second cover surface part 602, whether the second body part 102 is covered with the terminal protective case.

In the solution described in the disclosed embodiment, when a user does not need to use the foldable terminal, the user may fold the foldable terminal, and cover the foldable terminal with the terminal protective case 6. When the user needs to use the foldable terminal in a folded state, the processor 3 predicts a to-be-used display part of the foldable terminal based on status data of the user and/or an operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case 6 is uncovered, the processor 3 may control the to-be-used display part to directly display a specified interface, for example, a photographing interface.

The terminal protective case 6 with two sides easily opened may be fixedly installed on the body 1. When the terminal protective case 6 with two sides easily opened is fixedly installed on the body 1, both the first cover surface part 601 and the second cover surface part 602 can be separately uncovered.

In actual application, the foldable terminal has two states a folded state and an unfolded state. In the two different states, a process of controlling, by the processor 3, the display part to be on is as follows.

When an angle value detected by an angle sensor 5 is less than a preset angle threshold, the processor 3 determines that the foldable terminal is currently in a folded state.

It is assumed that the detected to-be-used display part is located on the first body part 101. When the covering detection sensor 4 disposed on the first body part 101 detects that the first body part 101 is not covered with the terminal protective case 6, the processor 3 controls the display part located on the first body part 101 to be on, and controls the other display part not to be on. When the covering detection sensor 4 disposed on the first body part 101 detects that the first body part 101 is covered with the terminal protective case 6, the processor 3 controls a preset partial area in the display part located on the first body part 101 to be on. The display part located on the second body part 102 always keeps screen-off, regardless of a detection result of the covering detection sensor 4 disposed on the second body part 102.

It is assumed that the detected to-be-used display part is located on the second body part 102. When the covering detection sensor 4 disposed on the second body part 102 detects that the second body part 102 is not covered with the terminal protective case 6, the processor 3 controls the display part located on the second body part 102 to be on, and controls the other display part not to be on. When the covering detection sensor 4 disposed on the second body part 102 detects that the second body part 102 is covered with the terminal protective case 6, the processor 3 controls a preset partial area in the display part located on the second body part 102 to be on. The display part located on the first body part 101 always keeps screen-off, regardless of a detection result of the covering detection sensor 4 disposed on the first body part 101.

When the angle value detected by the angle sensor 5 is greater than the preset angle threshold, the processor 3 determines that the body 1 is in an unfolded state.

When both of the covering detection sensors 4 disposed on the first body part 101 and the second body part 102 detect that the body 1 is covered with the terminal protective case 6, the processor 3 controls a preset partial area in a preset display part to be on.

When the covering detection sensor 4 disposed on the first body part 101 detects that the first body part 101 is covered with the terminal protective case 6 and the covering detection sensor 4 disposed on the second body part 102 detects that the second body part 102 is not covered with the terminal protective case 6, the processor 3 controls the display part located on the second body part 102 to be on, and controls the display part located on the first body part 101 not to be on.

When the covering detection sensor 4 disposed on the second body part 102 detects that the second body part 102 is covered with the terminal protective case 6 and the covering detection sensor 4 disposed on the first body part 101 detects that the first body part 101 is not covered with the terminal protective case 6, the processor 3 controls the display part located on the first body part 101 to be on, and controls the display part located on the second body part 102 not to be on.

When both of the covering detection sensors 4 disposed on the first body part 101 and the second body part 102 detect that the body 1 is not covered with the terminal protective case 6, the processor 3 controls the display component 2 to be on, that is, controls the two display parts to be both on.

In a possible implementation, the first cover surface part 601 and the first body part 101 are detachably connected, and the second cover surface part 602 and the second body part 102 are detachably connected.

In the solution described in the disclosed embodiment, an adhesive disk or a magnetic device may be disposed on the first cover surface part 601 and the second cover surface part 602 such that the terminal protective case 6 is attached to the body 1. Moreover, people can further uncover the terminal protective case 6 quite easily.

In a possible implementation, the terminal protective case 6 further includes an extended cover surface part 604. The extended cover surface part 604 is connected to the second cover surface part 602, a first detachable fastening apparatus is disposed on an edge of the extended cover surface part 604, and a second detachable fastening apparatus matching the first detachable fastening apparatus is disposed on the first cover surface part 601. The second cover surface part 602 and the second body part 102 are detachably connected.

In the solution described in the disclosed embodiment, the second cover surface part 602 and the second body part 102 are fixedly connected in a detachable manner, and an adhesive disk or a magnetic device may be disposed on the second cover surface part 602 such that the second cover surface part 602 is attached to the second body part 102. Moreover, people can further uncover the second cover surface part 602 quite easily. The extended cover surface part 604 and the first cover surface part 601 may be fixedly connected such that the terminal protective case 6 can be entirely installed on the foldable terminal. The first detachable fastening apparatus and the second detachable fastening apparatus may be clamped, or may be attached together using an attachment apparatus.

To enhance a function of the terminal protective case 6, a third detachable fastening apparatus is disposed on a joint between the extended cover surface part 604 and the second cover surface part 602. The third detachable fastening apparatus matches the first detachable fastening apparatus.

When the first detachable fastening apparatus is fastened to the third detachable fastening apparatus, the extended cover surface part 604 is formed into a fold protrusion structure naturally. The fold protrusion structure may be used as a support for a bottom of a mobile phone, and the first cover surface part 601 is used as a support for a back of the mobile phone such that the terminal protective case 6 has a function of a holder.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in a folded state, controlling, by the processor 3 if the covering detection sensor 4 detects that the first body part 101 is not covered with the terminal protective case, a to-be-used display part in the two display parts to be completely or partially on, where the to-be-used display part is a display part predicted based on status data of a user and/or an operation instruction entered by the user.

In a possible implementation, the controlling, by the processor 3 if the covering detection sensor 4 detects that the first body part 101 is not covered with the terminal protective case, a to-be-used display part in the two display parts to be completely or partially on includes if the to-be-used display part is located on the first body part 101 and the covering detection sensor 4 detects that the first body part 101 is not covered with the terminal protective case, controlling, by the processor 3, the to-be-used display part to be on.

An embodiment of this application provides a screen-on control method for a foldable terminal. The foldable terminal includes a body 1, a display component 2, and a processor 3. The body 1 includes a first body part 101 and a second body part 102 that are connected in a foldable connection manner. The display component 2 includes two display parts, and the two display parts are fastened on the different body parts. The method includes when the body 1 is in a folded state, if a to-be-used display part of the foldable terminal is located on the second body part 102, controlling, by the processor 3, the to-be-used display part to be on when receiving a screen-on instruction entered by a user, where the to-be-used display part is a display part predicted based on status data of the user and/or an operation instruction entered by the user.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in an unfolded state, if the covering detection sensor 4 detects that the first body part 101 is not covered with the terminal protective case, controlling, by the processor 3, the display component 2 to be on.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in a folded state, if the covering detection sensor 4 detects that the first body part 101 is covered with the terminal protective case, controlling, by the processor 3, a preset partial area in a to-be-used display part of the foldable terminal to be on, where the to-be-used display part is a display part predicted based on status data of a user and/or an operation instruction entered by the user, and the preset partial area is an area, corresponding to a transparent area of the terminal protective case, in the to-be-used display part.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in an unfolded state, if the covering detection sensor 4 detects that the first body part 101 is covered with the terminal protective case, controlling, by the processor 3, a partial area, corresponding to a transparent area of the terminal protective case, in the two display parts to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if both of the covering detection sensors 4 disposed on the two body parts respectively detect that the body parts are not covered with the terminal protective case, controlling, by the processor 3, the display component 2 to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if both of the covering detection sensors 4 disposed on the two body parts respectively detect that the body parts are covered with the terminal protective case, controlling, by the processor 3, a partial area, corresponding to a transparent area of the terminal protective case, in the two display parts to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if only one of the covering detection sensors 4 disposed on the two body parts detects that a body part on which the covering detection sensor 4 is located is covered with the terminal protective case, controlling, by the processor 3, a display part on a body part that is not covered with the terminal protective case to be on.

Beneficial effects of the technical solutions provided in the embodiments of this application are as follows.

The terminal protective case may be installed on the foldable terminal provided in the embodiments of this application. When the user does not need to use the foldable terminal, the user may fold the foldable terminal, and cover the foldable terminal with the terminal protective case. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

REFERENCE NUMERALS

Figure 1:
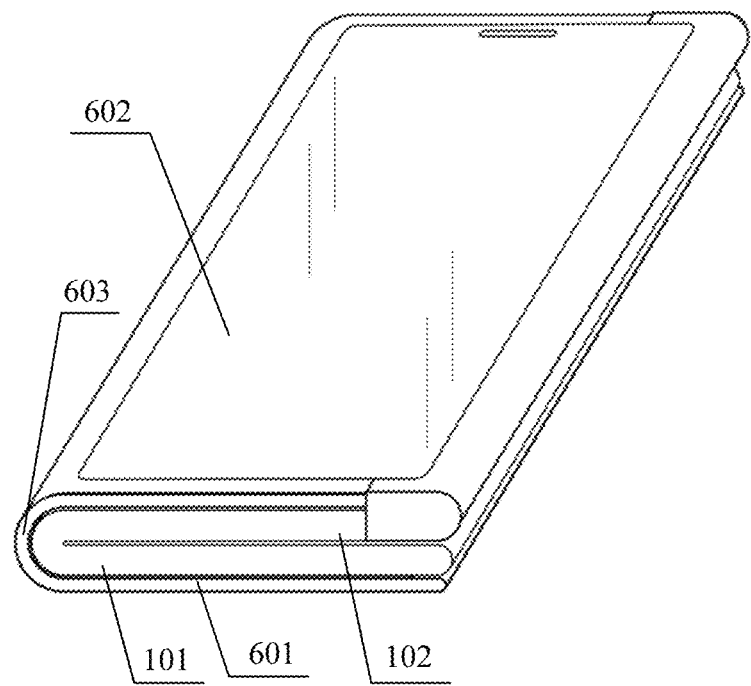
FIG. 1 is a schematic diagram of a foldable terminal according to an embodiment of this application.
Figure 2:
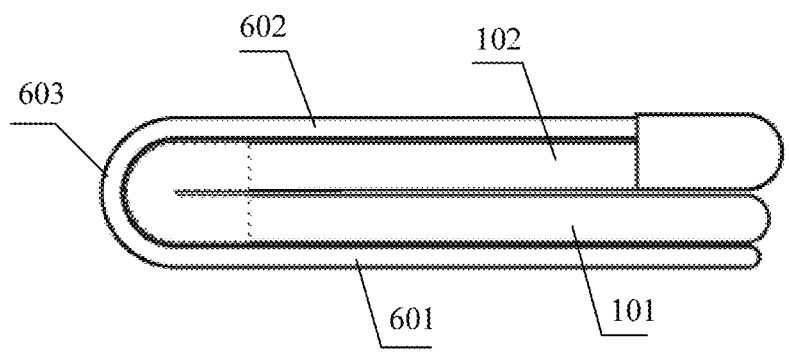
FIG. 2 is a schematic diagram of a foldable terminal according to an embodiment of this application.
Figure 3:
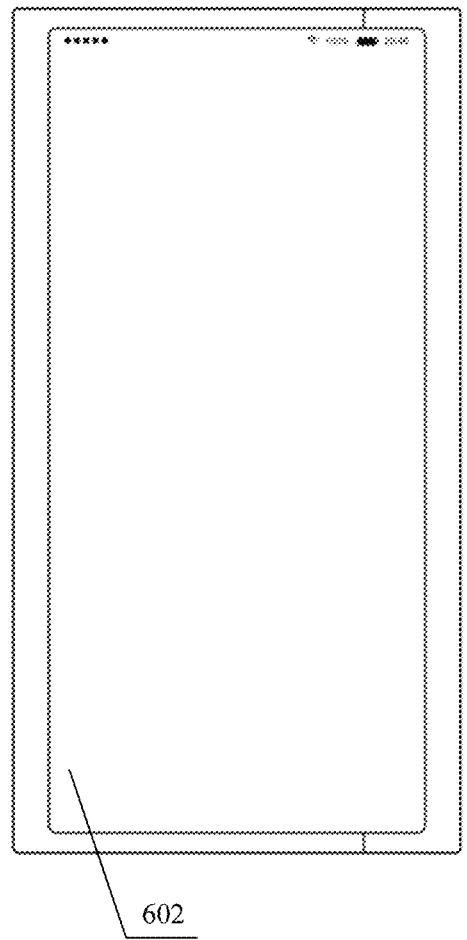
FIG. 3 is a schematic diagram of a foldable terminal according to an embodiment of this application.
Figure 4:
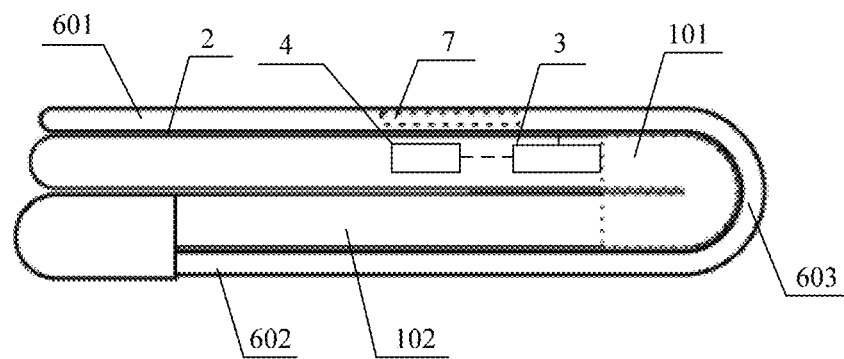
FIG. 4 is a schematic diagram of a foldable terminal according to an embodiment of this application.
Figure 5:
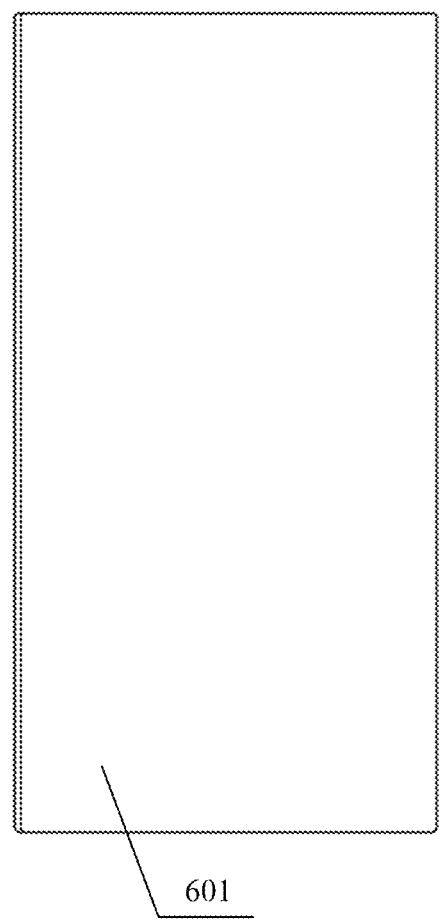
FIG. 5 is a schematic diagram of a foldable terminal according to an embodiment of this application.
Figure 6:
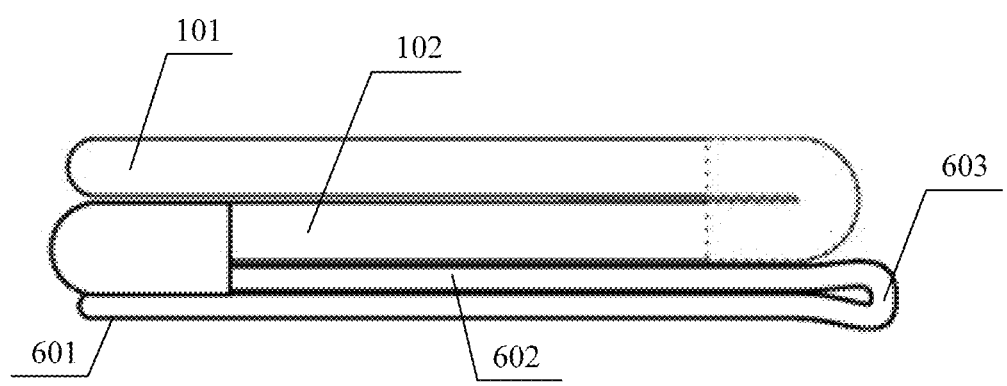
FIG. 6 is a schematic diagram of a foldable terminal according to an embodiment of this application.
Figure 7:
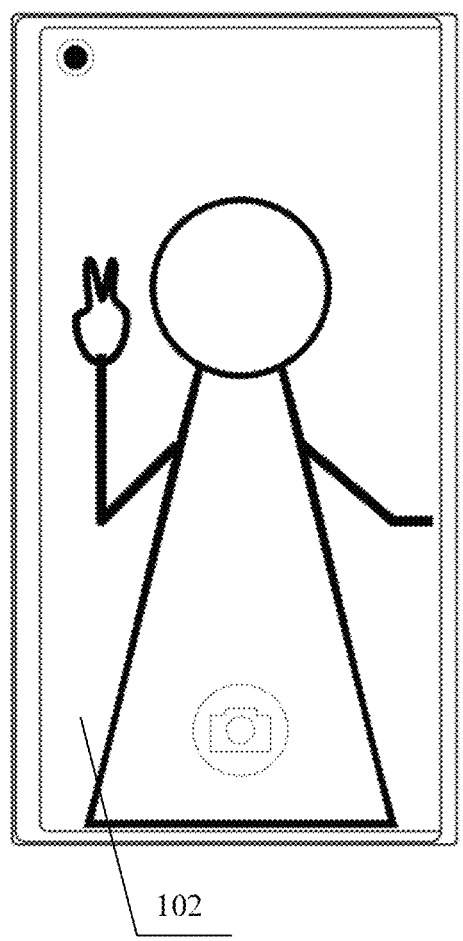
FIG. 7 is a schematic diagram of a foldable terminal according to an embodiment of this application.
Figure 8:
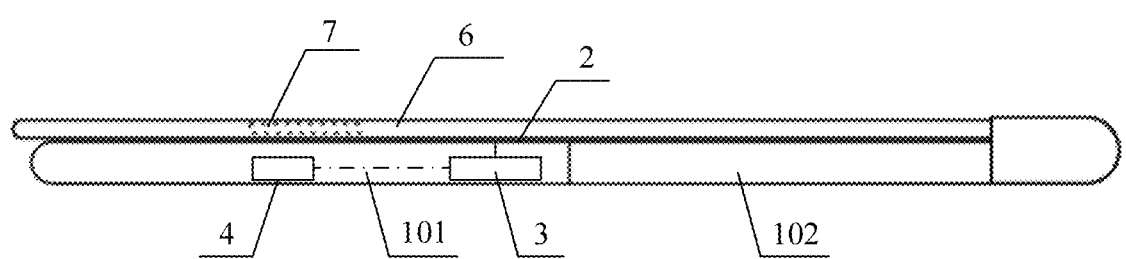
FIG. 8 is a schematic diagram of a foldable terminal according to an embodiment of this application.
Figure 9:
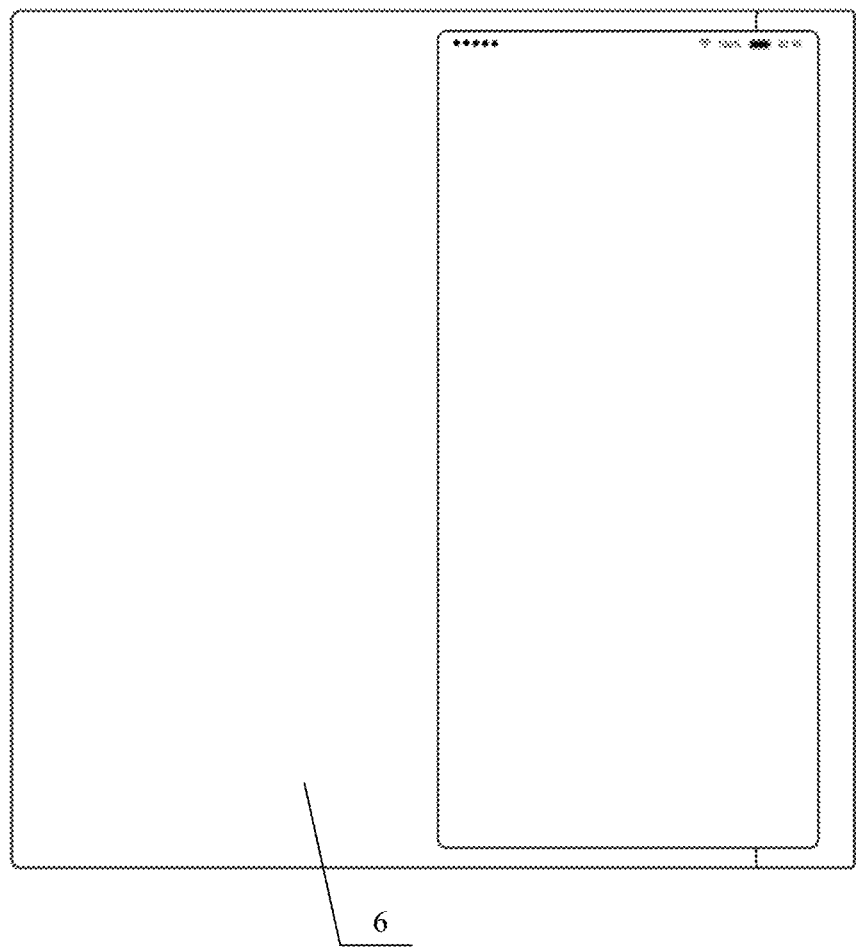
FIG. 9 is a schematic diagram of a foldable terminal according to an embodiment of this application.
Figure 10:
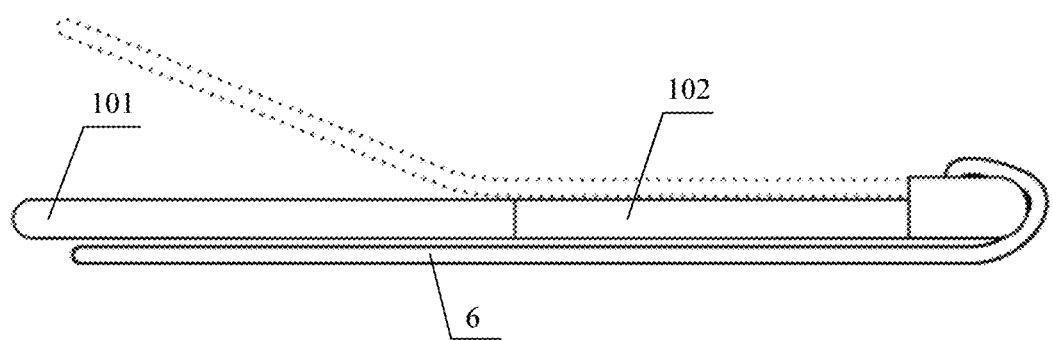
FIG. 10 is a schematic diagram of a foldable terminal according to an embodiment of this application.
Figure 11:
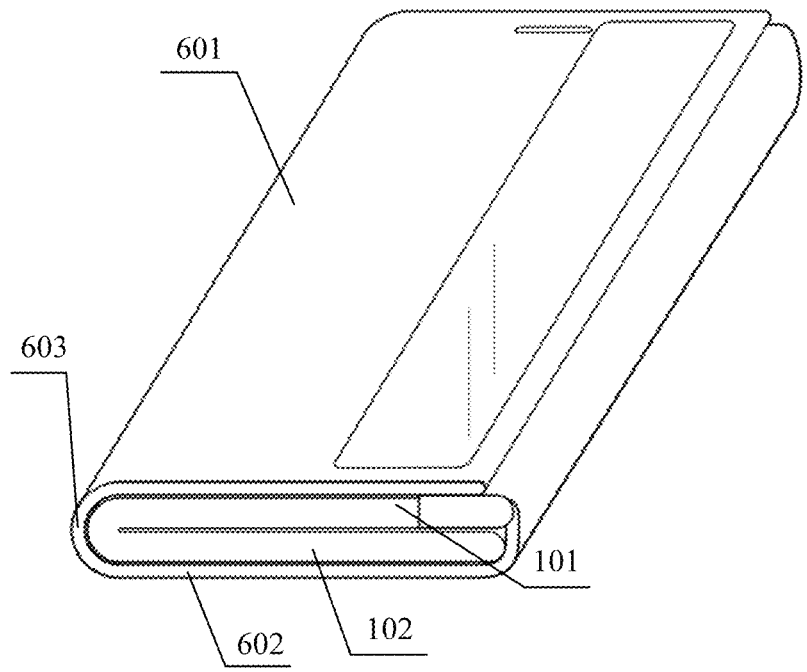
FIG. 11 is a schematic diagram of a foldable terminal according to an embodiment of this application.
Figure 12:
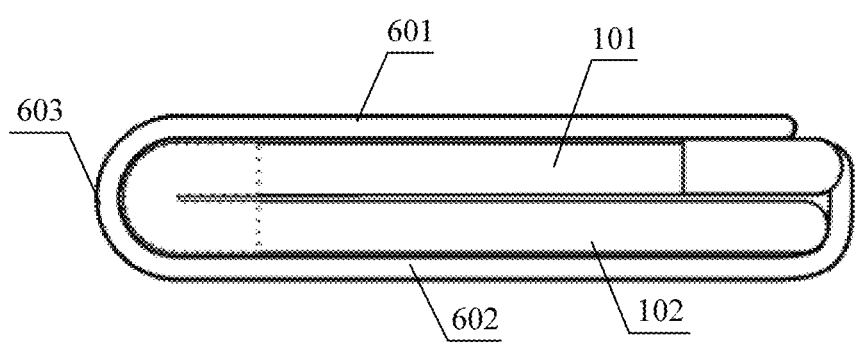
FIG. 12 is a schematic diagram of a foldable terminal according to an embodiment of this application.
Figure 13:
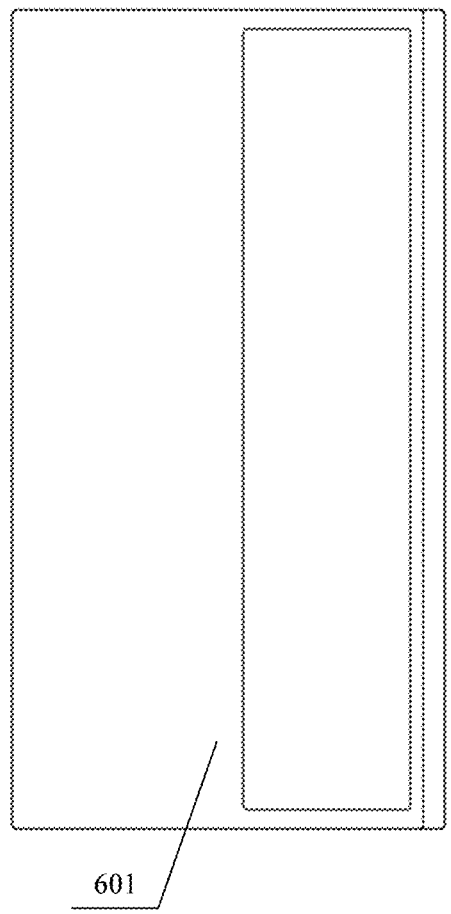
FIG. 13 is a schematic diagram of a foldable terminal according to an embodiment of this application.
Figure 14:
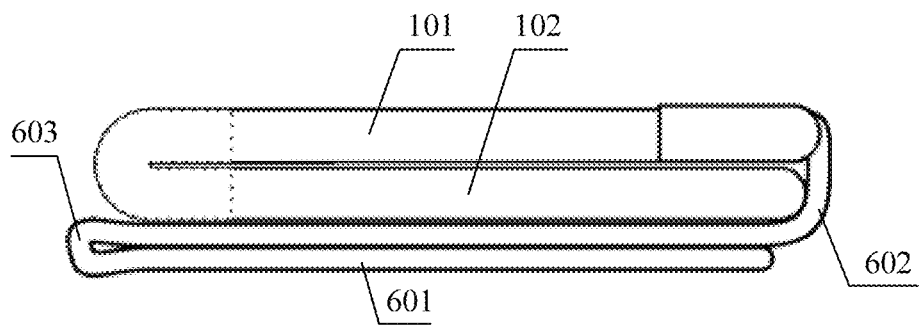
FIG. 14 is a schematic diagram of a foldable terminal according to an embodiment of this application.
Figure 15:
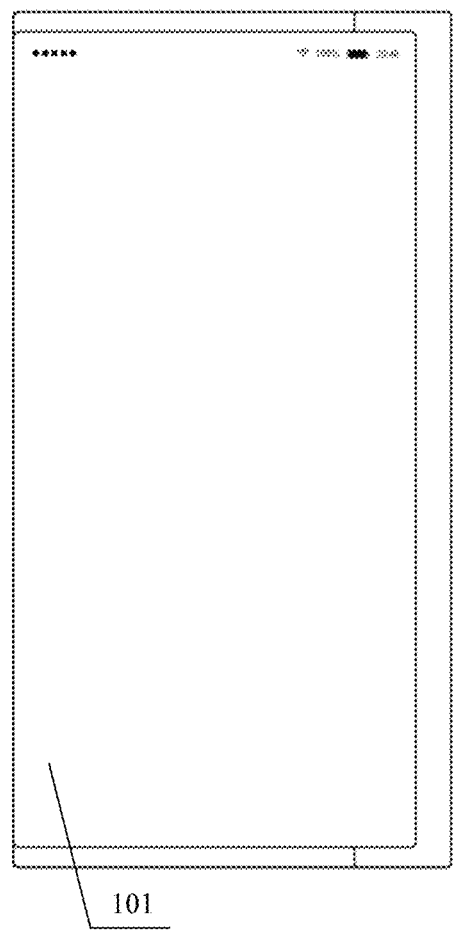
FIG. 15 is a schematic diagram of a foldable terminal according to an embodiment of this application.
Figure 16:
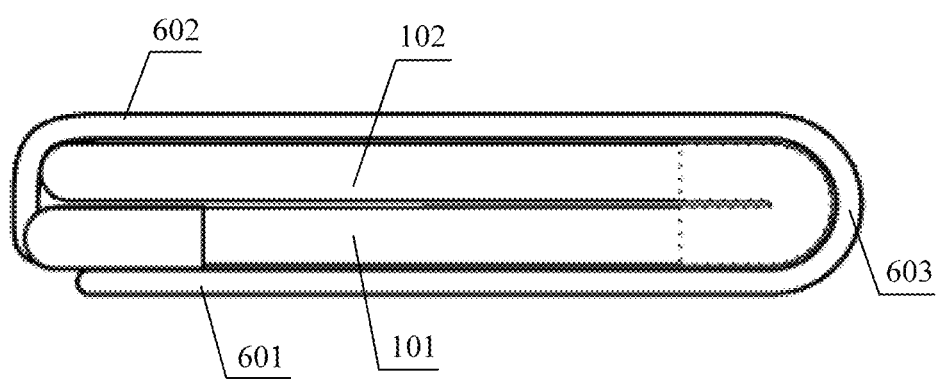
FIG. 16 is a schematic diagram of a foldable terminal according to an embodiment of this application.
Figure 17:
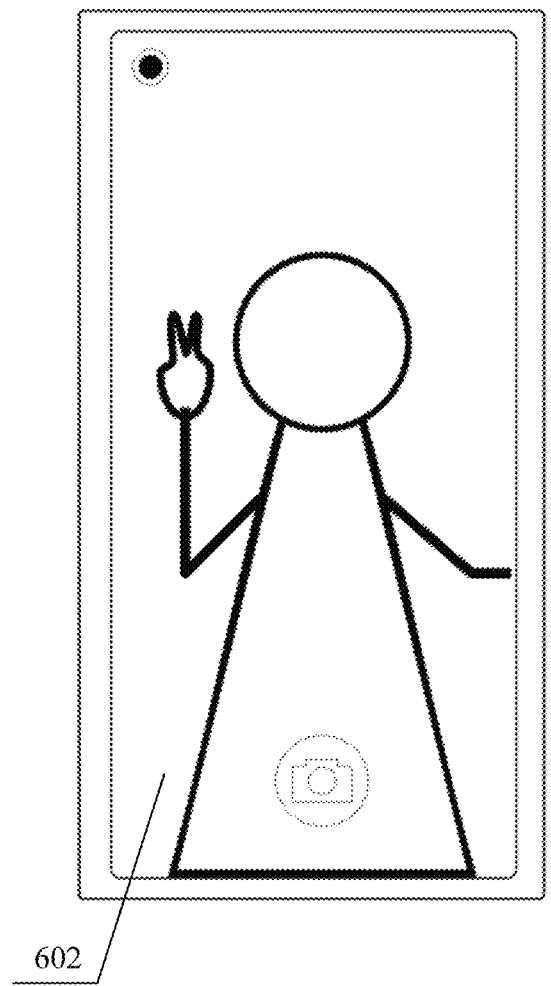
FIG. 17 is a schematic diagram of a foldable terminal according to an embodiment of this application.
Figure 18:
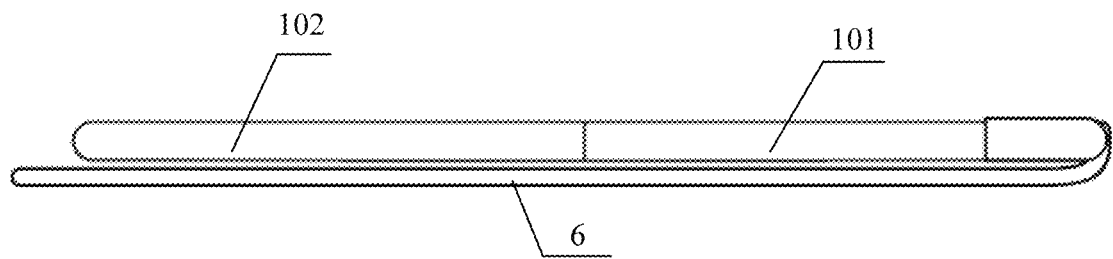
FIG. 18 is a schematic diagram of a foldable terminal according to an embodiment of this application.
Figure 19:
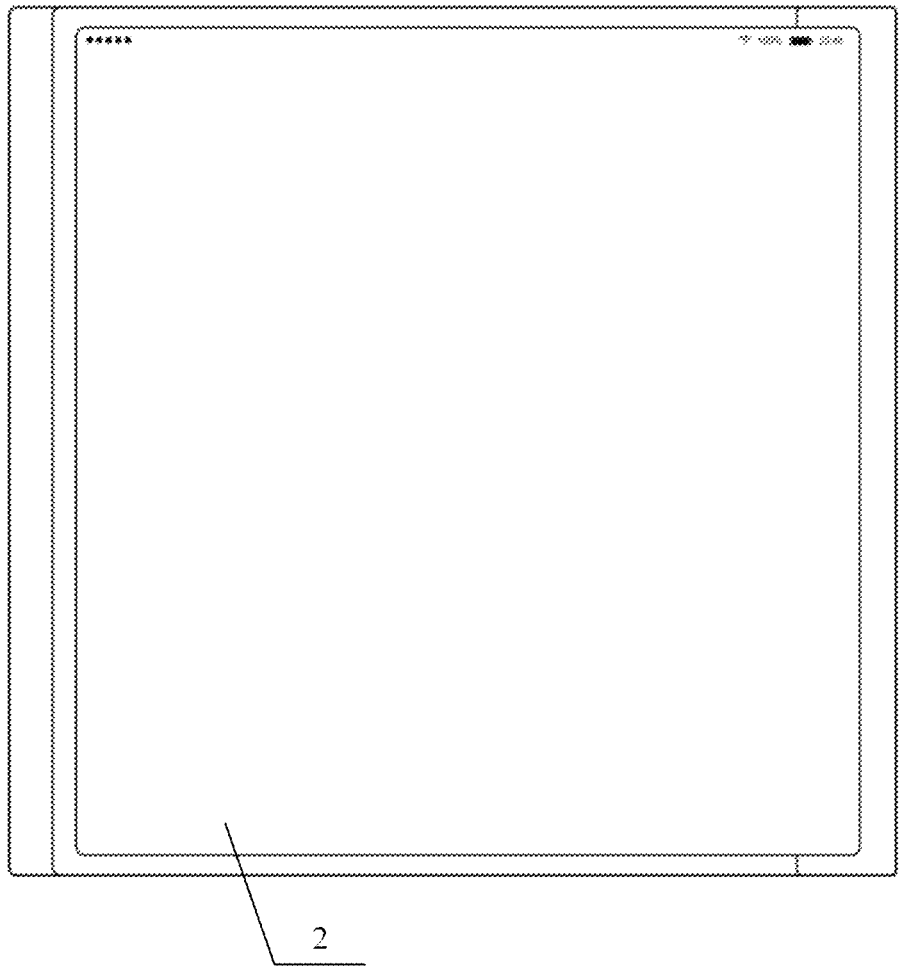
FIG. 19 is a schematic diagram of a foldable terminal according to an embodiment of this application.
Figure 20:
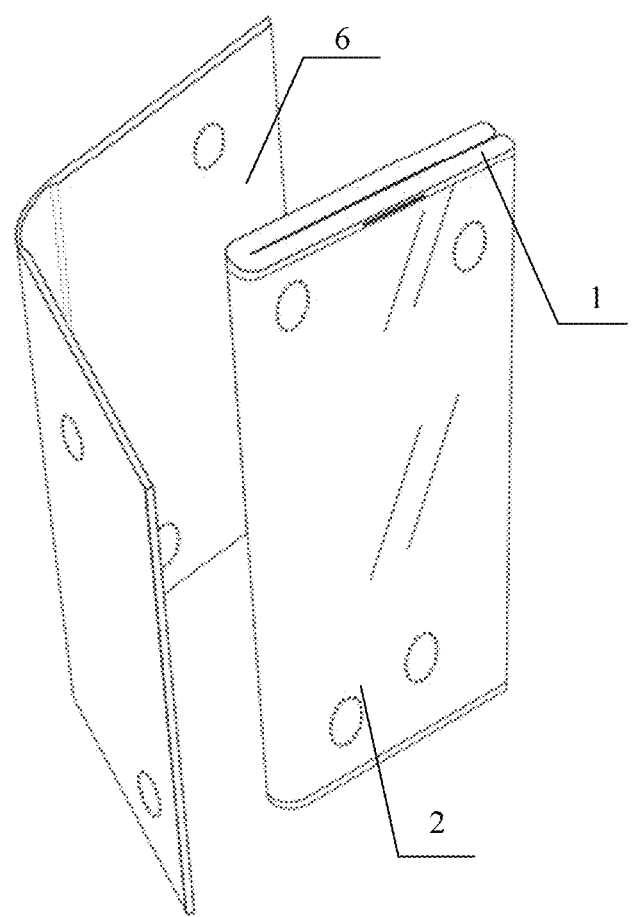
FIG. 20 is a schematic diagram of a foldable terminal according to an embodiment of this application.
Figure 21:
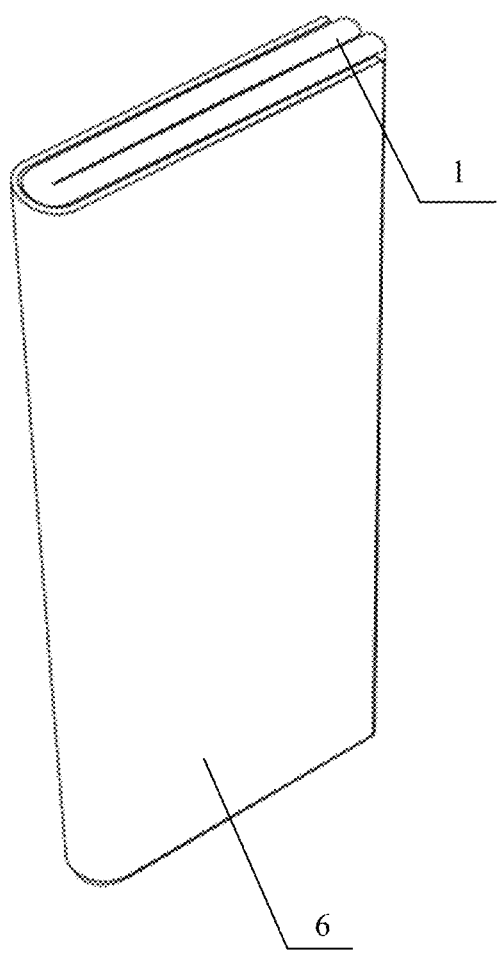
FIG. 21 is a schematic diagram of a foldable terminal according to an embodiment of this application.
Figure 22:
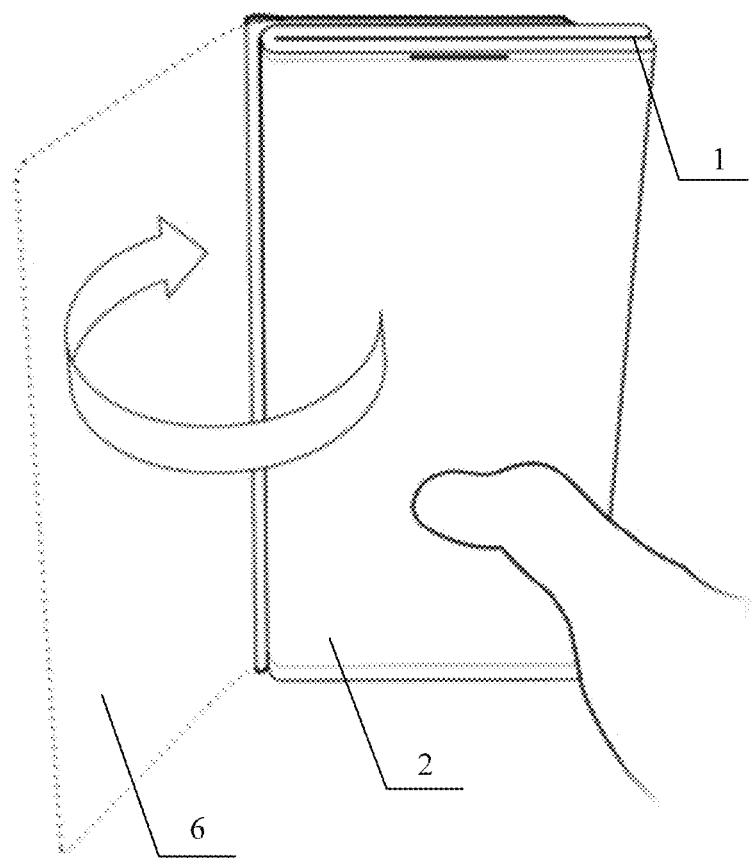
FIG. 22 is a schematic diagram of a foldable terminal according to an embodiment of this application.
Figure 23:
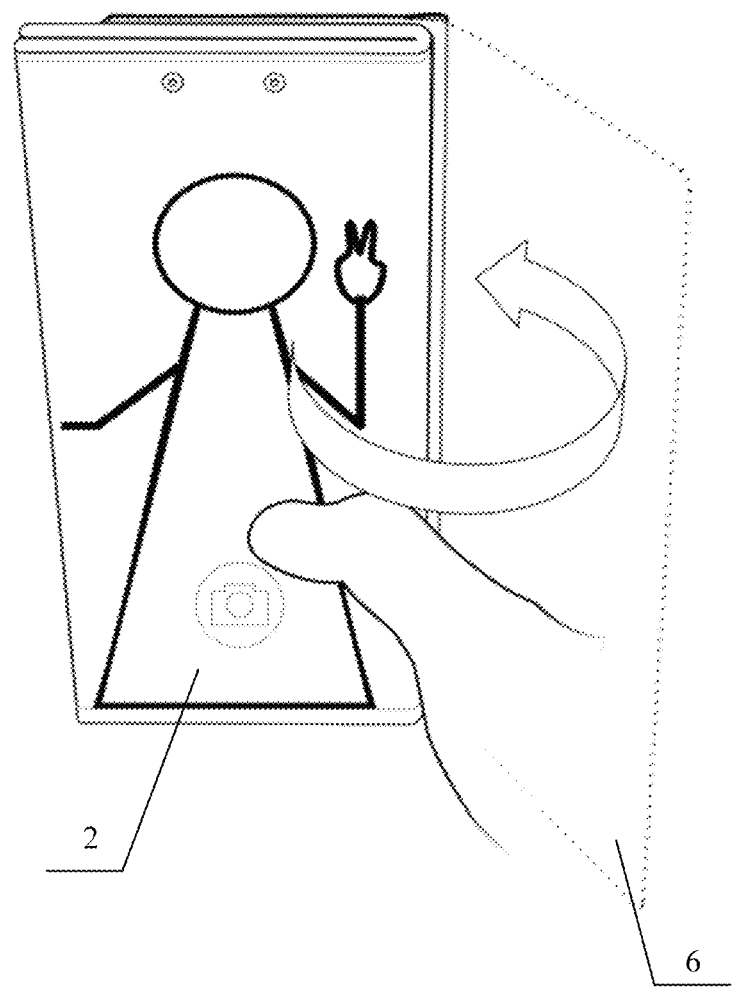
FIG. 23 is a schematic diagram of a foldable terminal according to an embodiment of this application.
Figure 24:
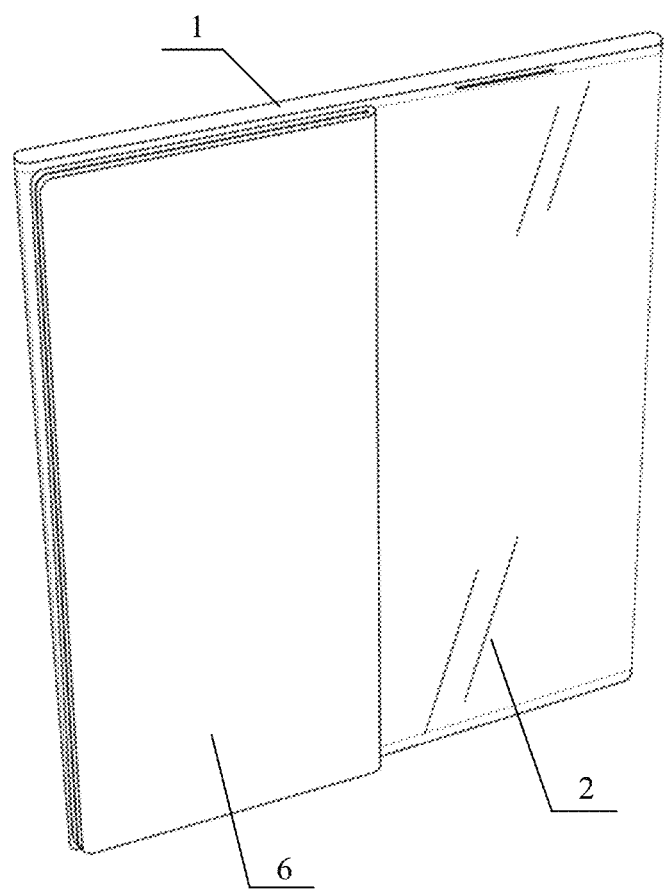
FIG. 24 is a schematic diagram of a foldable terminal according to an embodiment of this application.
Figure 25:
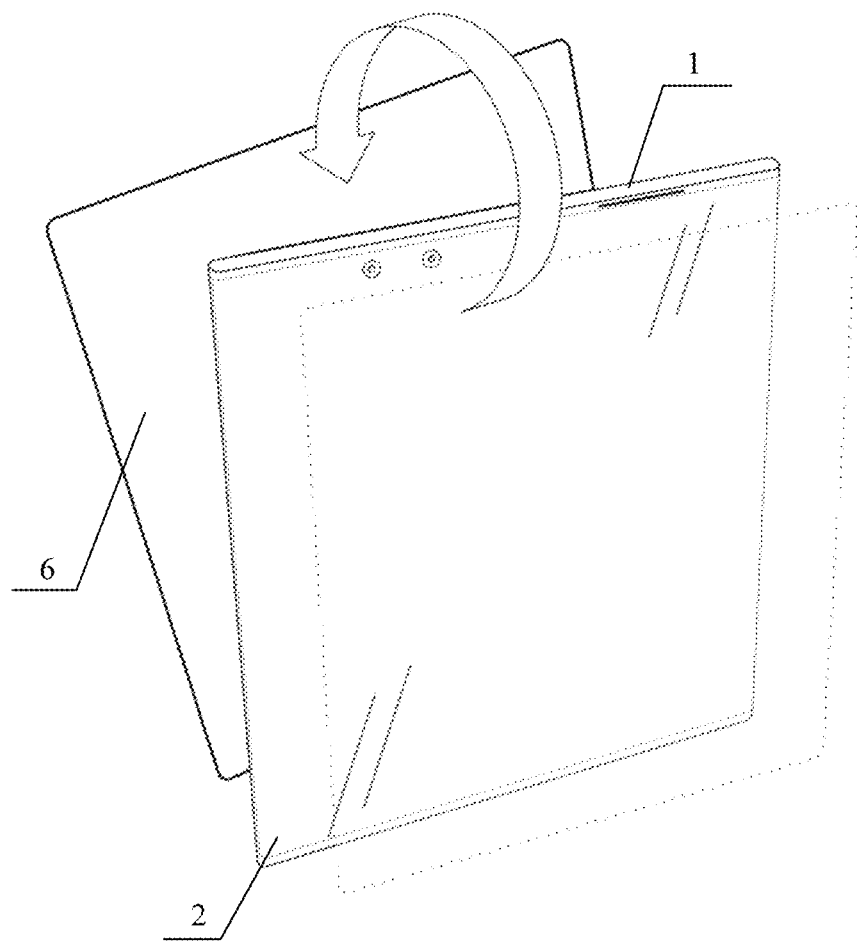
FIG. 25 is a schematic diagram of a foldable terminal according to an embodiment of this application.
Figure 26:
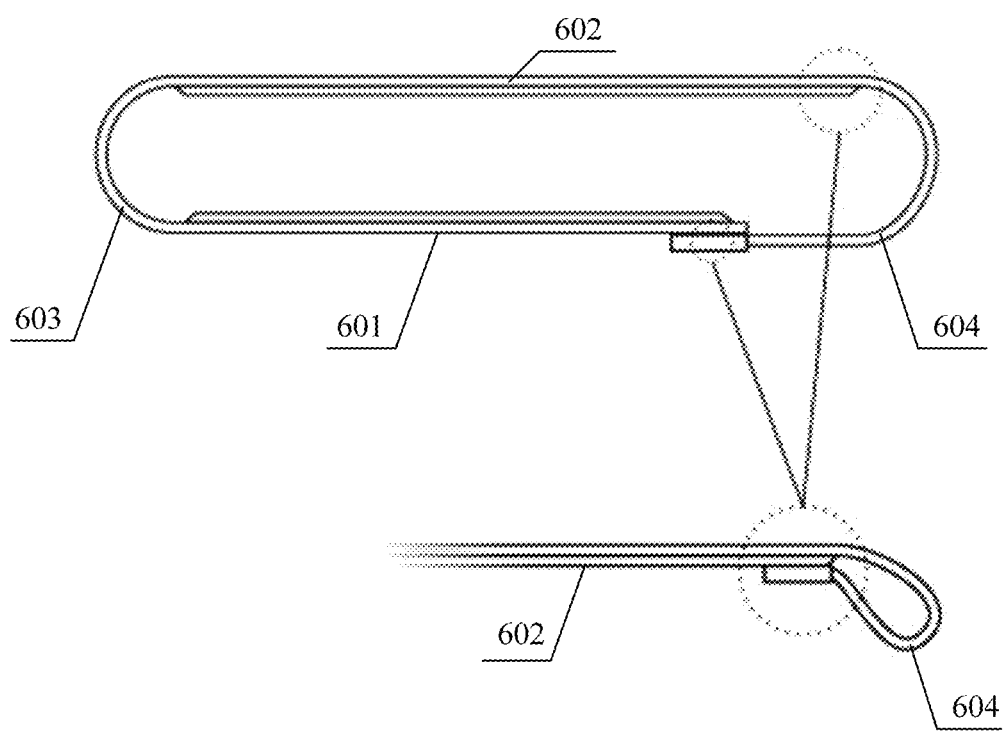
FIG. 26 is a schematic diagram of a terminal protective case 6 according to an embodiment of this application.

1: Body; 2: Display component; 3: Processor; 4: Covering detection sensor; 5: Angle sensor; 6: Terminal protective case; 7: Detected device; 101: First body part; 102: Second body part; 601: First cover surface part; 602: Second cover surface part; 603: Flexible connection surface part; 604: Extended cover surface part

DESCRIPTION OF EMBODIMENTS

Embodiments of this application provide a foldable terminal and a screen-on control method for the foldable terminal. A user may install a terminal protective case on the foldable terminal. When the user does not need to use the foldable terminal, the user may put away the foldable terminal by folding the foldable terminal, and cover the foldable terminal with the terminal protective case, to protect the foldable terminal. When the user needs to use the foldable terminal in a folded state, a processor 3 predicts a to-be-used display part of the foldable terminal based on status data of the user and/or an operation instruction entered by the user, and the user may uncover the terminal protective case on the to-be-used display part side. A covering detection sensor 4 detects that a first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in a folded state, control, if the covering detection sensor 4 detects that the first body part 101 is not covered with the terminal protective case, a to-be-used display part in the two display parts to be completely or partially on, where the to-be-used display part is a display part predicted based on status data of a user and/or an operation instruction entered by the user.

When the foldable terminal is in a fully folded state, the two display parts face opposite directions. The foldable terminal may be a dual-display foldable mobile phone, the first body part 101 and the second body part 102 may be hinged, and a display is disposed on each of the first body part 101 and the second body part 102. The foldable terminal may alternatively be a flexible-display foldable mobile phone.

The display component 2 may be a flexible display (for example, when the foldable terminal is a flexible-display foldable mobile phone), or may be two displays (for example, when the foldable terminal is a dual-display foldable mobile phone).

The status data of user may be image data of the user. The operation instruction entered by the user may be a voice instruction of the user, a touch instruction of the user, or a specific action instruction implemented by the user for operating the foldable terminal.

The to-be-used display part is a display part that is to be used by the user and that is predicted by the processor 3 based on data detected by sensors. The sensors may include one or more of sensors such as a gravity sensor, a gyroscope sensor, an acceleration sensor, a touch recognition sensor, a camera, and a microphone. The processor 3 may predict the to-be-used display part of the foldable terminal based on the data detected by the sensors.

A camera is used as an example. The processor obtains images photographed by cameras installed on body parts, and performs face detection on the images. When a face image is in an image photographed by a camera disposed on a body part, and a proportion of the face image in the entire image reaches a preset threshold, it is determined that a display part that belongs to a same body part as the camera is the to-be-used display part.

That the body part is covered with the terminal protective case means that the terminal protective case and the body part are close enough. Whether they are close enough may be determined through magnetic field strength detection or light intensity detection, or in another manner. The covering detection sensor 4 may be configured to implement detection such as magnetic field strength detection or light intensity detection. When a magnetic field strength detected by the covering detection sensor 4 is greater than a preset magnetic field strength threshold or a light intensity value is less than a preset light intensity threshold, the processor 3 determines that the body part on which the covering detection sensor 4 is located is covered with the terminal protective case. When the magnetic field strength detected by the covering detection sensor 4 is less than the preset magnetic field strength threshold or the light intensity value is greater than the preset light intensity threshold, the processor 3 determines that the body part on which the covering detection sensor 4 is located is not covered with the terminal protective case.

The covering detection sensor 4 may be an inductive sensor. Correspondingly, the terminal protective case installed on the foldable terminal needs to be provided with a detected device, and the detected device is a magnetic device. In this case, the covering detection sensor 4 can determine a distance from the detected device to the covering detection sensor 4 based on different sensed magnetic field strengths, to determine whether the foldable terminal is covered with the terminal protective case. The covering detection sensor 4 may alternatively be a photoelectric proximity sensor. In this case, the covering detection sensor 4 can determine a distance from the detected device to the covering detection sensor 4 based on different sensed light intensities, to determine whether the foldable terminal is covered with the terminal protective case.

Both the covering detection sensor 4 and the display component 2 are electrically connected to the processor 3.

That the foldable terminal is in a folded state means that an included angle between the first body part 101 and the second body part 102 is less than a preset angle threshold. That the foldable terminal is in an unfolded state means that the included angle between the first body part 101 and the second body part 102 is greater than the preset angle threshold. An angle sensor 5 may be used to detect the angle between the first body part 101 and the second body part 102. The angle sensor 5 is electrically connected to the processor 3, and the angle sensor 5 is configured to detect an angle value of the included angle between the two body parts, and send the detected angle value to the processor 3. When the angle value that is received by the processor 3 from the angle sensor 5 is greater than the preset angle threshold, it is determined that the body 1 is in an unfolded state. When the angle value that is received by the processor 3 from the angle sensor 5 is less than the preset angle threshold, it is determined that the body 1 is in a folded state.

The preset angle threshold may be set based on people's operation habit. Optionally, the preset angle threshold may be 180°. When the angle value that is received by the processor 3 from the angle sensor 5 is less than 180°, it is determined that the body 1 is in a folded state. When the angle value that is received by the processor 3 from the angle sensor 5 is equal to 180°, it is determined that the body 1 is in an unfolded state. That is, for the body 1, only a fully unfolded state is determined as an unfolded state, and remaining states are all determined as folded states. Optionally, the preset angle threshold may alternatively be 0°. When the angle value that is received by the processor 3 from the angle sensor 5 is equal to 0°, it is determined that the body 1 is in a folded state. When the angle value that is received by the processor 3 from the angle sensor 5 is greater than 0°, it is determined that the body 1 is in an unfolded state. That is, for the body 1, only a fully folded state is determined as a folded state, and remaining states are all determined as unfolded states.

In the solution described in this embodiment of this application, the foldable terminal may come with a terminal protective case, or the user may install a purchased terminal protective case on the foldable terminal. That the user installs a purchased terminal protective case on the foldable terminal is used as an example. When the user does not need to use the foldable terminal, the user may fold the foldable terminal, and cover the foldable terminal with the terminal protective case. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case is uncovered, the processor 3 may control the to-be-used display part to directly display a specified interface, for example, a photographing interface.

When the body 1 is in a folded state, people want to use one display part of the foldable terminal for display in most cases. Therefore, subsequently the processor 3 further needs to predict a display part to be used by the user. In addition, only the predicted to-be-used display part can be on, and a display part not to be used is not on.

When the body 1 is in an unfolded state, based on people's actual use habit, people want to use the two display parts (that is, the entire display component 2) of the foldable terminal for display in most cases. Therefore, there is no need to predict a to-be-used display part of the foldable terminal, or it is considered by default that the two display parts are both to-be-used display parts of the foldable terminal.

The terminal protective case installed on the foldable terminal needs to include at least three parts a first cover surface part, a second cover surface part, and a flexible connection surface part used for bending. The first cover surface part is connected to the second cover surface part through the flexible connection surface part.

In actual application, an installation manner of the terminal protective case is related to a location at which the covering detection sensor 4 is disposed. Assuming that the covering detection sensor 4 is disposed on the first body part 101, an optional installation manner is a sidewall of the second cover surface part of the terminal protective case is fixedly installed on the body 1, but the first cover surface part is not fastened to the body 1. That is, one side of the terminal protective case 6 is fixedly installed on the body 1. In addition, when the terminal protective case fully covers the foldable terminal, the first cover surface part covers the first body part 101, the second cover surface part covers the second body part 102, and the flexible connection surface part covers a foldable part of the body 1. In such an installation manner, the first cover surface part can be separately uncovered, but the first cover surface part needs to be uncovered if the second cover surface part is to be uncovered. Therefore, when the to-be-used display part is located on the second body part 102 and the covering detection sensor 4 disposed on the first body part 101 detects that the first body part 101 is not covered with the terminal protective case, it may be considered that the second body part 102 is not covered with the terminal protective case either.

For example, the covering detection sensor 4 is disposed on the first body part 101 and one side of the terminal protective case is fixedly installed on the foldable terminal. It is assumed that the predicted to-be-used display part is located on the first body part 101. When the covering detection sensor 4 disposed on the first body part 101 detects that the first body part 101 is not covered with the terminal protective case, the processor 3 controls the display part located on the first body part 101 to be on.

It is assumed that the determined to-be-used display part is located on the second body part 102. When the covering detection sensor 4 disposed on the first body part 101 detects that the first body part 101 is not covered with the terminal protective case, it is considered by default that the second body part 102 is not covered with the terminal protective case either. In this case, the processor 3 controls the display part disposed on the second body part 102 to be on.

In a possible implementation, controlling, if the covering detection sensor 4 detects that the first body part 101 is not covered with the terminal protective case, a to-be-used display part in the two display parts to be completely or partially on includes if the to-be-used display part is located on the first body part 101 and the covering detection sensor 4 detects that the first body part 101 is not covered with the terminal protective case, controlling the to-be-used display part to be on.

In a possible implementation, the processor 3 is configured to when the body 1 is in a folded state, if the to-be-used display part of the foldable terminal is located on the second body part 102, control the to-be-used display part to be on when receiving a screen-on instruction entered by a user, where the to-be-used display part is the display part predicted based on the status data of the user and/or the operation instruction entered by the user.

In the solution described in this embodiment of this application, when the predicted to-be-used display part is located on the second body part 102, because the second body part 102 is not provided with a covering detection sensor 4, whether the second body part 102 is covered with a terminal protective case cannot be accurately determined. In this case, the user can turn on the to-be-used display part only after performing a specific operation, for example, making a specific gesture or pressing a specific button. In this way, the display part of the foldable terminal is on more accurately.

In a possible implementation, the processor 3 is configured to when the body 1 is in an unfolded state, if the covering detection sensor 4 detects that the first body part 101 is not covered with the terminal protective case, control the display component 2 to be on.

In the solution described in this embodiment of this application, for example, the covering detection sensor 4 is disposed on the first body part 101 and one side of the terminal protective case is fixedly installed on the foldable terminal. When the body 1 is in an unfolded state and the covering detection sensor 4 disposed on the first body part 101 detects that the first body part 101 is not covered with the terminal protective case, it is considered by default that the second body part 102 is not covered with the terminal protective case either. In this case, the processor 3 controls the display component 2 to be on, that is, controls the two display parts to be both on.

In a possible implementation, the processor 3 is configured to when the body 1 is in a folded state, if the covering detection sensor 4 detects that the first body part 101 is covered with the terminal protective case, control a preset partial area in the to-be-used display part of the foldable terminal to be on, where the to-be-used display part is the display part predicted based on the status data of the user and/or the operation instruction entered by the user, and the preset partial area is an area, corresponding to a transparent area of the terminal protective case, in the to-be-used display part.

In the solution described in this embodiment of this application, for example, the covering detection sensor 4 is disposed on the first body part 101 and one side of the terminal protective case is fixedly installed on the foldable terminal. When the body 1 is in a folded state and the determined display part is located on the first body part 101, if the covering detection sensor 4 disposed on the first body part 101 detects that the first body part 101 is covered with the terminal protective case, the processor 3 controls a preset partial area in the display part located on the first body part 101 to be on. If there is no transparent area on the first cover surface part, that is, if there is no preset partial area in the display part located on the first body part 101, the processor 3 controls the to-be-used display part not to be on.

When the body 1 is in a folded state and the determined display part is disposed on the second body part 102, if the covering detection sensor 4 disposed on the first body part 101 detects that the first body part 101 is covered with the terminal protective case, the second body part 102 is also definitely covered with the terminal protective case in a normal state. In this case, the processor 3 controls a preset partial area in the display part disposed on the second body part 102 to be on. If there is no transparent area on the second cover surface part, that is, if there is no preset partial area in the display part located on the second body part 102, the processor 3 controls the display part located on the second body part 102 not to be on.

In a possible implementation, the processor 3 is configured to when the body 1 is in an unfolded state, if the covering detection sensor 4 detects that the first body part 101 is covered with the terminal protective case, control a partial area, corresponding to a transparent area of the terminal protective case, in the two display parts to be on.

A preset display part is a display part, corresponding to the transparent area of the terminal protective case, in the display component 2. A preset partial area is an area, corresponding to the transparent area of the terminal protective case, in the preset display part.

In the solution described in this embodiment of this application, for example, the covering detection sensor 4 is disposed on the first body part 101 and one side of the terminal protective case is fixedly installed on the foldable terminal. When the body 1 is in an unfolded state and the covering detection sensor 4 disposed on the first body part 101 detects that the first body part 101 is covered with the terminal protective case, the second body part 102 is also definitely covered with the terminal protective case in a normal state. In this case, the processor 3 controls a preset partial area in a preset display part to be on.

If there is no transparent area on the first cover surface part and the second cover surface part, that is, if there is no preset display part in the body 1, the processor 3 controls the entire display component 2 not to be on. If there is no transparent area on the first cover surface part and there is a transparent area on the second cover surface part, that is, if the preset display part is the display part on the second body part 102, the processor 3 controls a preset partial area in the display part located on the second body part 102 to be on. If there is a transparent area on the first cover surface part and there is no transparent area on the second cover surface part, that is, if the preset display part is the display part on the first body part 101, the processor 3 controls a preset partial area in the display part located on the first body part 101 to be on. If there is a transparent area on each of the first cover surface part and the second cover surface part, that is, if the preset display part is the two display parts, the processor 3 controls preset partial areas in the two display parts to be on.

In the foregoing example, the user installs a purchased terminal protective case on the foldable terminal. Alternatively, the foldable terminal may come with a terminal protective case, that is, the terminal protective case may be a part of the foldable terminal.

An embodiment of this application provides a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101, and the covering detection sensor 4 is configured to detect whether the first body part 101 is covered with a terminal protective case. The processor 3 is configured to when the body 1 is in a folded state, control, if the covering detection sensor 4 detects that the first body part 101 is not covered with the terminal protective case, a to-be-used display part in the two display parts to be completely or partially on, where the to-be-used display part is a display part predicted based on status data of a user and/or an operation instruction entered by the user.

The foldable terminal further includes the terminal protective case 6. The terminal protective case 6 includes a first cover surface part 601, a second cover surface part 602, and a flexible connection surface part 603. The first cover surface part 601 is connected to the second cover surface part 602 through the flexible connection surface part 603. A detected device 7 adapted to the covering detection sensor 4 is disposed on the first cover surface part 601. The first cover surface part 601 is configured to cover a surface, facing an outer side of the body 1 when the body 1 is in a folded state, of the first body part 101. The second cover surface part 602 is configured to cover a surface, facing the outer side of the body 1 when the body 1 is in a folded state, of the second body part 102. The detecting whether the first body part 101 is covered with a terminal protective case includes determining, by detecting the detected device 7, whether the first body part 101 is covered with the terminal protective case.

In the solution described in this embodiment of this application, when the user does not need to use the foldable terminal, the user may fold the foldable terminal, and cover the foldable terminal with the terminal protective case 6. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case 6 is uncovered, the processor 3 may control the to-be-used display part to directly display a specified interface, for example, a photographing interface.

A sidewall of the second cover surface part 602 of the terminal protective case 6 is fastened to the body 1, but the first cover surface part 601 is not fastened to the body 1. That is, one side of the terminal protective case 6 is fixedly installed on the body 1. Optionally, the terminal protective case 6 is clamped to the body 1. To be specific, the sidewall of the second cover surface part 602 is clamped to the body 1. One side of the second cover surface part 602 of the terminal protective case 6 is fixedly installed on the body 1. In this case, the first cover surface part 601 can be separately uncovered, but the first cover surface part 601 needs to be uncovered if the second cover surface part 602 is to be uncovered. Therefore, when the to-be-used display part is located on the second body part 102 and the covering detection sensor 4 disposed on the first body part 101 detects that the first body part 101 is not covered with the terminal protective case 6, it may be considered that the second body part 102 is not covered with the terminal protective case 6 either.

In a possible implementation, as shown in FIG. 1 to FIG. 10, the sidewall of the second cover surface part 602 is fastened to an edge of the second body part 102.

In the solution described in this embodiment of this application, as shown in FIG. 1 to FIG. 10, the second cover surface part 602 may be clamped or adhered to the second body part 102. A direction in which the terminal protective case 6 is uncovered is the same as a direction in which the foldable terminal is unfolded. This conforms to a user operation habit better. The second cover surface part 602 may be clamped or adhered to the second body part 102.

In a possible implementation, as shown in FIG. 11 to FIG. 19, the sidewall of the second cover surface part 602 is fastened to an edge of the first body part 101.

In the solution described in this embodiment of this application, as shown in FIG. 11 to FIG. 19, the second cover surface part 602 may be clamped or adhered to the first body part 101. A direction in which the terminal protective case 6 is uncovered is opposite to a direction in which the foldable terminal is unfolded. In addition, the edges of the first body part 101 and the second body part 102 are also covered with the terminal protective case 6 such that the foldable terminal is better protected.

In actual application, the foldable terminal has two states a folded state and an unfolded state. In the two different states, a process of controlling, by the processor 3, the display part to be on is as follows.

When an angle value detected by an angle sensor 5 is less than a preset angle threshold, the processor 3 determines that the foldable terminal is currently in a folded state.

It is assumed that the detected to-be-used display part is located on the first body part 101. When the covering detection sensor 4 disposed on the first body part 101 detects that the first body part 101 is not covered with the terminal protective case 6, the processor 3 controls the display part located on the first body part 101 to be on, and controls the other display part not to be on. When the covering detection sensor 4 disposed on the first body part 101 detects that the first body part 101 is covered with the terminal protective case 6, the processor 3 controls a preset partial area in the display part located on the first body part 101 to be on. If there is no transparent area on the first cover surface part 601, that is, if there is no preset partial area in the display part located on the first body part 101, the processor 3 controls the to-be-used display part not to be on.

It is assumed that the detected to-be-used display part is located on the second body part 102. When the covering detection sensor 4 disposed on the first body part 101 detects that the first body part 101 is not covered with the terminal protective case 6, it is considered by default that the second body part 102 is not covered with the terminal protective case 6 either. In this case, the processor 3 controls the display part disposed on the second body part 102 to be on, and controls the other display part not to be on. When the covering detection sensor 4 disposed on the first body part 101 detects that the first body part 101 is covered with the terminal protective case 6, the second body part 102 is also definitely covered with the terminal protective case 6 in a normal state. In this case, the processor 3 controls a preset partial area in the display part disposed on the second body part 102 to be on. If there is no transparent area on the second cover surface part 602, that is, if there is no preset partial area in the display part located on the second body part 102, the processor 3 controls the display part located on the second body part 102 not to be on.

When the angle value detected by the angle sensor 5 is greater than the preset angle threshold, the processor 3 determines that the body 1 is in an unfolded state.

When the covering detection sensor 4 disposed on the first body part 101 detects that the first body part 101 is covered with the terminal protective case 6, the second body part 102 is also definitely covered with the terminal protective case 6 in a normal state. In this case, the processor 3 controls a preset partial area in a preset display part to be on. If there is no transparent area on the first cover surface part and the second cover surface part, that is, if there is no preset display part in the body 1, the processor 3 controls the entire display component 2 not to be on. If there is no transparent area on the first cover surface part and there is a transparent area on the second cover surface part, that is, if the preset display part is the display part on the second body part 102, the processor 3 controls a preset partial area in the display part located on the second body part 102 to be on. If there is a transparent area on the first cover surface part and there is no transparent area on the second cover surface part, that is, if the preset display part is the display part on the first body part 101, the processor 3 controls a preset partial area in the display part located on the first body part 101 to be on. If there is a transparent area on each of the first cover surface part and the second cover surface part, that is, if the preset display part is the two display parts, the processor 3 controls preset partial areas in the two display parts to be on.

When the covering detection sensor 4 disposed on the first body part 101 detects that the first body part 101 is not covered with the terminal protective case 6, it is considered by default that the second body part 102 is not covered with the terminal protective case 6 either. In this case, the processor 3 controls the display component 2 to be on, that is, controls the two display parts to be both on.

The covering detection sensor 4 may be disposed on each of the two body parts of the foldable terminal, and in this case, the terminal protective case with two sides easily opened may be fixedly installed on the foldable terminal. The terminal protective case installed on the foldable terminal may be originally provided for the foldable terminal, or may be purchased by the user.

An embodiment of this application provides a foldable terminal. The foldable terminal includes a body 1, a display component 2, a processor 3, and two covering detection sensors 4. The body 1 includes a first body part 101 and a second body part 102 that are connected in a foldable connection manner. The display component 2 includes two display parts, and the two display parts are fastened on the different body parts. The two covering detection sensors 4 are respectively disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in a folded state, if a covering detection sensor 4 on a body part on which a to-be-used display part of the foldable terminal is located detects that the body part is not covered with the terminal protective case, control the to-be-used display part to be on, where the to-be-used display part is a display part predicted based on status data of a user and/or an operation instruction entered by the user.

In the solution described in this embodiment of this application, the foldable terminal may come with a terminal protective case, or the user may install a purchased terminal protective case on the foldable terminal. That the user installs a purchased terminal protective case on the foldable terminal is used as an example. When the user does not need to use the foldable terminal, the user may fold the foldable terminal, and cover the foldable terminal with the terminal protective case. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case is uncovered, the processor 3 may control the to-be-used display part to directly display a specified interface, for example, a photographing interface.

When the body 1 is in a folded state, people want to use one display part of the foldable terminal for display in most cases. Therefore, subsequently the processor 3 further needs to determine a display part to be used by the user. In addition, only the determined to-be-used display part can be on, and a display part not to be used is not on. The foldable terminal may use a method, such as gravity sensing, gyroscope sensing, acceleration detection, touch recognition, and face recognition, to detect the display part currently used by the user.

When the body 1 is in an unfolded state, based on people's actual use habit, people want to use the two display parts (that is, the entire display component 2) of the foldable terminal for display in most cases. Therefore, there is no need to determine a to-be-used display part of the foldable terminal, or it is considered by default that the two display parts are both to-be-used display parts of the foldable terminal.

The terminal protective case installed on the foldable terminal needs to include at least three parts a first cover surface part, a second cover surface part, and a flexible connection surface part used for bending. The first cover surface part is connected to the second cover surface part through the flexible connection surface part.

In actual application, the covering detection sensors 4 are disposed on both the first body part 101 and the second body part 102, and the terminal protective case with two sides easily opened may be fixedly installed on the foldable terminal. In such an installation manner, both the first cover surface part and the second cover surface part can be separately uncovered. In addition, when the terminal protective case fully covers the foldable terminal, the first cover surface part covers the first body part, the second cover surface part covers the second body part, and the flexible connection surface part covers a foldable part of the body 1.

In a possible implementation, the processor 3 is configured to when the body 1 is in a folded state, if a covering detection sensor 4 on a body part on which a to-be-used display part of the foldable terminal is located detects that the body part is covered with the terminal protective case, control a partial area, corresponding to a transparent area of the terminal protective case, in the to-be-used display part to be on, where the to-be-used display part is a display part predicted based on status data of a user and/or an operation instruction entered by the user.

In the solution described in this embodiment of this application, for example, the terminal protective case with two sides easily opened is fixedly installed on the foldable terminal. It is assumed that the detected to-be-used display part is located on the first body part 101. When the covering detection sensor 4 disposed on the first body part 101 detects that the first body part 101 is not covered with the terminal protective case, the processor 3 controls the display part located on the first body part 101 to be on, and controls the other display part not to be on. When the covering detection sensor 4 disposed on the first body part 101 detects that the first body part 101 is covered with the terminal protective case, the processor 3 controls a preset partial area in the display part located on the first body part 101 to be on. If there is no transparent area on the first cover surface part, that is, if there is no preset partial area in the display part located on the first body part 101, the processor 3 controls the to-be-used display part not to be on. The display part located on the second body part 102 always keeps screen-off, regardless of a detection result of the covering detection sensor 4 disposed on the second body part 102.

It is assumed that the detected to-be-used display part is located on the second body part 102. When the covering detection sensor 4 disposed on the second body part 102 detects that the second body part 102 is not covered with the terminal protective case, the processor 3 controls the display part located on the second body part 102 to be on, and controls the other display part not to be on. When the covering detection sensor 4 disposed on the second body part 102 detects that the second body part 102 is covered with the terminal protective case, the processor 3 controls a preset partial area in the display part located on the second body part 102 to be on. If there is no transparent area on the second cover surface part, that is, if there is no preset partial area in the display part located on the second body part 102, the processor 3 controls the to-be-used display part not to be on. The display part located on the first body part 101 always keeps screen-off, regardless of a detection result of the covering detection sensor 4 disposed on the first body part 101.

In a possible implementation, the processor 3 is configured to when the body 1 is in an unfolded state, if both of the covering detection sensors 4 disposed on the two body parts respectively detect that the body parts are not covered with the terminal protective case, control the display component 2 to be on, if both of the covering detection sensors 4 disposed on the two body parts respectively detect that the body parts are covered with the terminal protective case, control a partial area, corresponding to a transparent area of the terminal protective case, in the two display parts to be on, or if only one of the covering detection sensors 4 disposed on the two body parts detects that a body part on which the covering detection sensor 4 is located is covered with the terminal protective case, control a display part on a body part that is not covered with the terminal protective case to be on.

In the solution described in this embodiment of this application, for example, the terminal protective case with two sides easily opened is fixedly installed on the foldable terminal. When both of the covering detection sensors 4 disposed on the first body part 101 and the second body part 102 detect that the body 1 is covered with the terminal protective case, the processor 3 controls a preset partial area in a preset display part to be on. If there is no transparent area on the first cover surface part and the second cover surface part, that is, if there is no preset display part in the body 1, the processor 3 controls the entire display component 2 not to be on. If there is no transparent area on the first cover surface part and there is a transparent area on the second cover surface part, that is, if the preset display part is the display part on the second body part 102, the processor 3 controls a preset partial area in the display part located on the second body part 102 to be on. If there is a transparent area on the first cover surface part and there is no transparent area on the second cover surface part, that is, if the preset display part is the display part on the first body part 101, the processor 3 controls a preset partial area in the display part located on the first body part 101 to be on. If a transparent area is disposed on each of the first cover surface part and the second cover surface part, that is, if the preset display part is the two display parts, the processor 3 controls a preset partial area in each display part to be on.

When the covering detection sensor 4 disposed on the first body part 101 detects that the first body part 101 is covered with the terminal protective case and the covering detection sensor 4 disposed on the second body part 102 detects that the second body part 102 is not covered with the terminal protective case, the processor 3 controls the display part located on the second body part 102 to be on, and controls the display part located on the first body part 101 not to be on.

When the covering detection sensor 4 disposed on the second body part 102 detects that the second body part 102 is covered with the terminal protective case 6 and the covering detection sensor 4 disposed on the first body part 101 detects that the first body part 101 is not covered with the terminal protective case, the processor 3 controls the display part located on the first body part 101 to be on, and controls the display part located on the second body part 102 not to be on.

When both of the covering detection sensors 4 disposed on the first body part 101 and the second body part 102 detect that the body 1 is not covered with the terminal protective case, the processor 3 controls the display component 2 to be on, that is, controls the two display parts to be both on.

The covering detection sensor 4 may be disposed on each of the two body parts of the foldable terminal, and in this case, the terminal protective case with two sides easily opened may be fixedly installed on the foldable terminal. In the foregoing, the user installs a purchased terminal protective case on the foldable terminal. Alternatively, the foldable terminal may come with a terminal protective case, that is, the terminal protective case may be a part of the foldable terminal.

An embodiment of this application provides a foldable terminal. The foldable terminal includes a body 1, a display component 2, a processor 3, and two covering detection sensors 4. The body 1 includes a first body part 101 and a second body part 102 that are connected in a foldable connection manner. The display component 2 includes two display parts, and the two display parts are fastened on the different body parts. The two covering detection sensors 4 are respectively disposed on the first body part 101 and the second body part 102. The covering detection sensor 4 disposed on the first body part 101 is configured to detect whether the first body part 101 is covered with a terminal protective case, and the covering detection sensor 4 disposed on the second body part 102 is configured to detect whether the second body part 102 is covered with a terminal protective case. The processor 3 is configured to when the body 1 is in a folded state, if a covering detection sensor 4 on a body part on which a to-be-used display part of the foldable terminal is located detects that the body part is not covered with the terminal protective case, control the to-be-used display part to be on, where the to-be-used display part is a display part predicted based on status data of a user and/or an operation instruction entered by the user.

The foldable terminal further includes the terminal protective case 6. The terminal protective case 6 includes a first cover surface part 601, a second cover surface part 602, and a flexible connection surface part 603. The first cover surface part 601 is connected to the second cover surface part 602 through the flexible connection surface part 603. A detected device 7 adapted to the covering detection sensor 4 on the first body part 101 is disposed on the first cover surface part 601. A detected device 7 adapted to the covering detection sensor 4 on the second body part 102 is disposed on the second cover surface part 602. The first cover surface part 601 is configured to cover a surface, facing an outer side of the body 1 when the body 1 is in a folded state, of the first body part 101. The second cover surface part 602 is configured to cover a surface, facing the outer side of the body 1 when the body 1 is in a folded state, of the second body part 102. The detected device 7 adapted to the covering detection sensor 4 is disposed on the first cover surface part 601. The detecting whether the first body part 101 is covered with a terminal protective case includes determining, by detecting the detected device 7 disposed on the first cover surface part 601, whether the first body part 101 is covered with the terminal protective case. The detecting whether the second body part 102 is covered with a terminal protective case includes determining, by detecting the detected device 7 disposed on the second cover surface part 602, whether the second body part 102 is covered with the terminal protective case.

In the solution described in the disclosed embodiment, when the user does not need to use the foldable terminal, the user may fold the foldable terminal, and cover the foldable terminal with the terminal protective case 6. When the user needs to use the foldable terminal in a folded state, the processor 3 predicts the to-be-used display part of the foldable terminal based on the status data of the user and/or the operation instruction entered by the user, and the user may uncover the terminal protective case on the to-be-used display part side. The covering detection sensor 4 detects that the first body part 101 is not covered with the terminal protective case, and then the processor 3 controls the to-be-used display part to be automatically on. Therefore, the user can use the foldable terminal without manually pressing a button to turn on the corresponding display part. A process of operating the foldable terminal is comparatively simple and efficient.

Further, when the terminal protective case is uncovered, the processor 3 may further control the to-be-used display part to directly display a specified interface, for example, a photographing interface.

The terminal protective case 6 with two sides easily opened may be fixedly installed on the body 1. When the terminal protective case 6 with two sides easily opened is fixedly installed on the body 1, both the first cover surface part 601 and the second cover surface part 602 can be separately uncovered.

In a possible implementation, the first cover surface part 601 and the first body part 101 are detachably connected, and the second cover surface part 602 and the second body part 102 are detachably connected.

In the solution described in the disclosed embodiment, as shown in FIG. 20 to FIG. 25, an adhesive disk or a magnetic device may be disposed on the first cover surface part 601 and the second cover surface part 602 such that the terminal protective case 6 is attached to the body 1. Moreover, people can further uncover the terminal protective case 6 conveniently.

The first cover surface part 601 and the second cover surface part 602 may further be detachably connected to edges of the first body part 101 and the second body part 102, respectively.

In a possible implementation, the terminal protective case 6 further includes an extended cover surface part 604. The extended cover surface part 604 is connected to the second cover surface part 602, a first detachable fastening apparatus is disposed on an edge of the extended cover surface part 604, and a second detachable fastening apparatus matching the first detachable fastening apparatus is disposed on the first cover surface part 601. The second cover surface part 601 and the second body part 102 are detachably connected.

In the solution described in the disclosed embodiment, as shown in FIG. 26 to FIG. 30, the second cover surface part 602 and the second body part 102 are fixedly connected in a detachable manner, and an adhesive disk or a magnetic device may be disposed on the second cover surface part 602 such that the second cover surface part 602 is attached to the second body part 102. Moreover, people can further uncover the second cover surface part 602 quite easily. The extended cover surface part 604 and the first cover surface part 601 may be fixedly connected such that the terminal protective case 6 can be entirely installed on the foldable terminal. The first detachable fastening apparatus and the second detachable fastening apparatus may be clamped, or may be attached together using an attachment apparatus.

To enhance a function of the terminal protective case 6, a third detachable fastening apparatus is disposed on a joint between the extended cover surface part 604 and the second cover surface part 602. The third detachable fastening apparatus matches the first detachable fastening apparatus.

Figure 27:
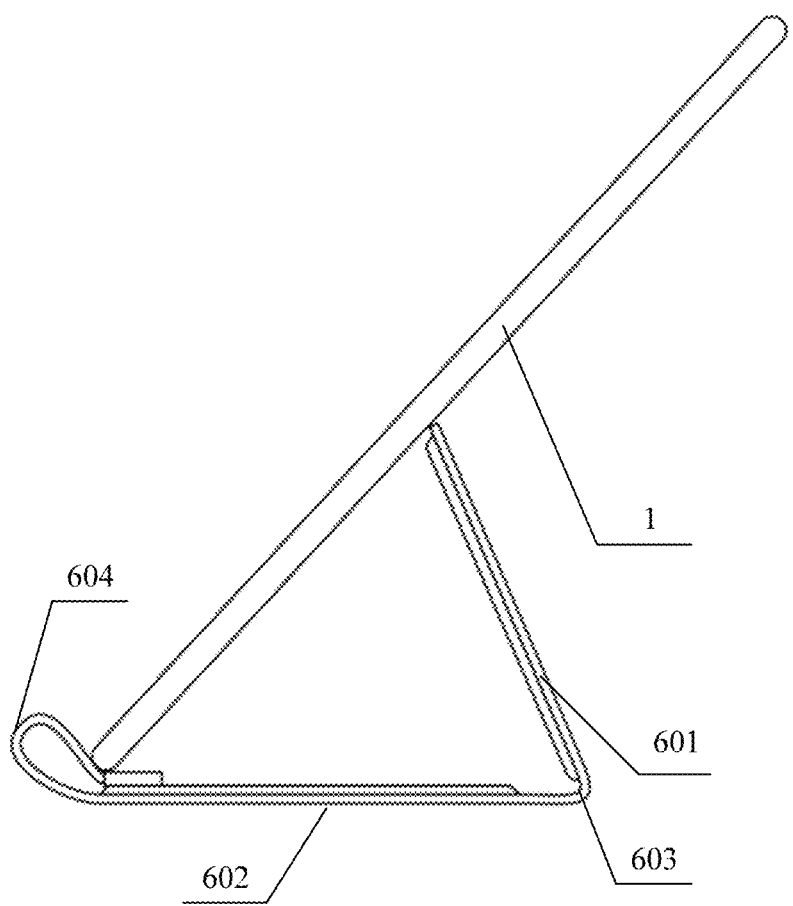
FIG. 27 is a schematic diagram of a foldable terminal according to an embodiment of this application.
Figure 28:
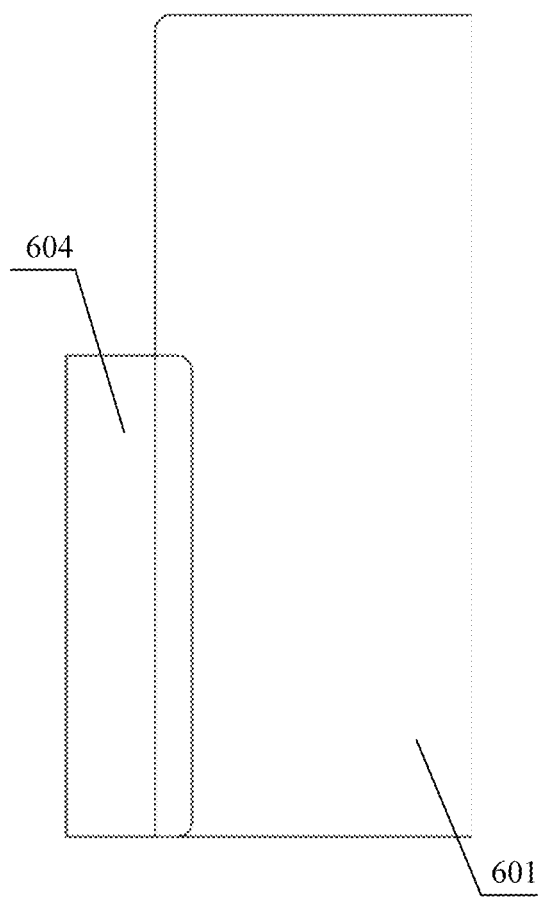
FIG. 28 is a schematic diagram of a terminal protective case 6 according to an embodiment of this application.
Figure 29:
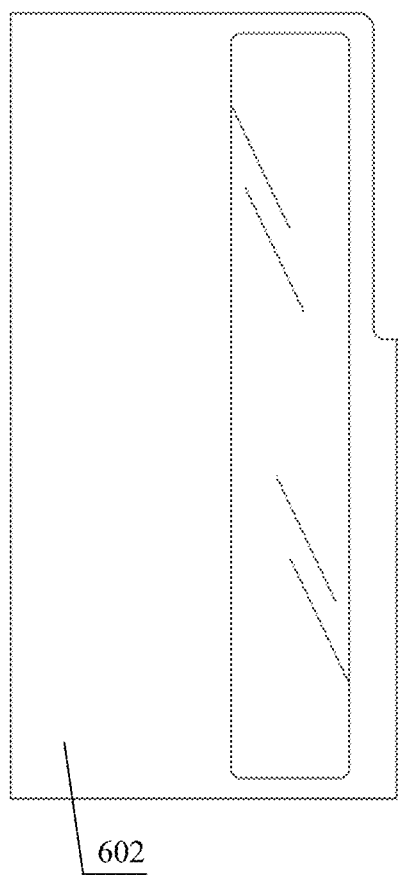
FIG. 29 is a schematic diagram of a terminal protective case 6 according to an embodiment of this application.
Figure 30:
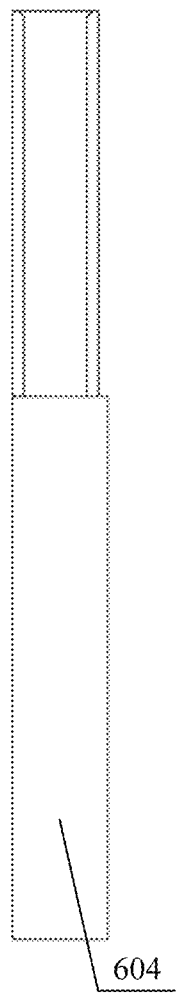
FIG. 30 is a schematic diagram of a terminal protective case 6 according to an embodiment of this application.

When the first detachable fastening apparatus is fastened to the third detachable fastening apparatus, the extended cover surface part 604 is formed into a fold protrusion structure naturally. The fold protrusion structure may be used as a support for a bottom of a mobile phone, and the first cover surface part 601 is used as a support for a back of the foldable terminal such that the terminal protective case 6 has a function of a holder, as shown in FIG. 27.

In actual application, the foldable terminal has two states a folded state and an unfolded state. In the two different states, a process of controlling, by the processor 3, the display part to be on is as follows.

When an angle value detected by an angle sensor 5 is less than a preset angle threshold, the processor 3 determines that the foldable terminal is currently in a folded state.

It is assumed that the predicted to-be-used display part is located on the first body part 101. When the covering detection sensor 4 disposed on the first body part 101 detects that the first body part 101 is not covered with the terminal protective case 6, the processor 3 controls the display part located on the first body part 101 to be on, and controls the other display part not to be on. When the covering detection sensor 4 disposed on the first body part 101 detects that the first body part 101 is covered with the terminal protective case 6, the processor 3 controls a preset partial area in the display part located on the first body part 101 to be on. If there is no transparent area on the first cover surface part 601, that is, if there is no preset partial area in the display part located on the first body part 101, the processor 3 controls the to-be-used display part not to be on. The display part located on the second body part 102 always keeps screen-off, regardless of a detection result of the covering detection sensor 4 disposed on the second body part 102.

It is assumed that the predicted to-be-used display part is located on the second body part 102. When the covering detection sensor 4 disposed on the second body part 102 detects that the second body part 102 is not covered with the terminal protective case 6, the processor 3 controls the display part located on the second body part 102 to be on, and controls the other display part not to be on. When the covering detection sensor 4 disposed on the second body part 102 detects that the second body part 102 is covered with the terminal protective case 6, the processor 3 controls a preset partial area in the display part located on the second body part 102 to be on. If there is no transparent area on the second cover surface part 602, that is, if there is no preset partial area in the display part located on the second body part 102, the processor 3 controls the to-be-used display part not to be on. The display part located on the first body part 101 keeps screen-off, regardless of a detection result of the covering detection sensor 4 disposed on the first body part 101.

When the angle value detected by the angle sensor 5 is greater than the preset angle threshold, the processor 3 determines that the body 1 is in an unfolded state.

When both of the covering detection sensors 4 disposed on the first body part 101 and the second body part 102 detect that the body 1 is covered with the terminal protective case 6, the processor 3 controls a preset partial area in a preset display part to be on. If there is no transparent area on the first cover surface part and the second cover surface part, that is, if there is no preset display part in the body 1, the processor 3 controls the entire display component 2 not to be on. If there is no transparent area on the first cover surface part and there is a transparent area on the second cover surface part, that is, if the preset display part is the display part on the second body part 102, the processor 3 controls a preset partial area in the display part located on the second body part 102 to be on. If there is a transparent area on the first cover surface part and there is no transparent area on the second cover surface part, that is, if the preset display part is the display part on the first body part 101, the processor 3 controls a preset partial area in the display part located on the first body part 101 to be on. If there is a transparent area on each of the first cover surface part and the second cover surface part, that is, if the preset display part is the two display parts, the processor 3 controls preset partial areas in the two display parts to be on.

When the covering detection sensor 4 disposed on the first body part 101 detects that the first body part 101 is covered with the terminal protective case 6 and the covering detection sensor 4 disposed on the second body part 102 detects that the second body part 102 is not covered with the terminal protective case, the processor 3 controls the display part located on the second body part 102 to be on, and controls the display part located on the first body part 101 not to be on.

When the covering detection sensor 4 disposed on the second body part 102 detects that the second body part 102 is covered with the terminal protective case 6 and the covering detection sensor 4 disposed on the first body part 101 detects that the first body part 101 is not covered with the terminal protective case 6, the processor 3 controls the display part located on the first body part 101 to be on, and controls the display part located on the second body part 102 not to be on.

When both of the covering detection sensors 4 disposed on the first body part 101 and the second body part 102 detect that the body 1 is not covered with the terminal protective case 6, the processor 3 controls the display component 2 to be on, that is, controls the two display parts to be both on.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in a folded state, controlling, by the processor 3 if the covering detection sensor 4 detects that the first body part 101 is not covered with the terminal protective case, a to-be-used display part in the two display parts to be completely or partially on, where the to-be-used display part is a display part predicted based on status data of a user and/or an operation instruction entered by the user.

In a possible implementation, the controlling, by the processor 3 if the covering detection sensor 4 detects that the first body part 101 is not covered with the terminal protective case, a to-be-used display part in the two display parts to be completely or partially on includes if the to-be-used display part is located on the first body part 101 and the covering detection sensor 4 detects that the first body part 101 is not covered with the terminal protective case, controlling, by the processor 3, the to-be-used display part to be on.

An embodiment of this application provides a screen-on control method for a foldable terminal. The foldable terminal includes a body 1, a display component 2, and a processor 3. The body 1 includes a first body part 101 and a second body part 102 that are connected in a foldable connection manner. The display component 2 includes two display parts, and the two display parts are fastened on the different body parts. The method includes when the body 1 is in a folded state, if a to-be-used display part of the foldable terminal is located on the second body part 102, controlling, by the processor 3, the to-be-used display part to be on when receiving a screen-on instruction entered by a user, where the to-be-used display part is a display part predicted based on status data of the user and/or an operation instruction entered by the user.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in an unfolded state, if the covering detection sensor 4 detects that the first body part 101 is not covered with the terminal protective case, controlling, by the processor 3, the display component 2 to be on.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in a folded state, if the covering detection sensor 4 detects that the first body part 101 is covered with the terminal protective case, controlling, by the processor 3, a preset partial area in a to-be-used display part of the foldable terminal to be on, where the to-be-used display part is a display part predicted based on status data of a user and/or an operation instruction entered by the user, and the preset partial area is an area, corresponding to a transparent area of the terminal protective case, in the to-be-used display part.

An embodiment of this application provides a screen-on control method for a foldable terminal. The foldable terminal includes a body 1, a display component 2, a processor 3, and a covering detection sensor 4. The body 1 includes a first body part 101 and a second body part 102 that are connected in a foldable connection manner. The display component 2 includes two display parts, and the two display parts are fastened on the different body parts. The covering detection sensor 4 is disposed on the first body part 101. The method includes detecting, by the covering detection sensor 4, whether the first body part 101 is covered with a terminal protective case, and when the body 1 is in an unfolded state, if the covering detection sensor 4 detects that the first body part 101 is covered with the terminal protective case, controlling, by the processor 3, a partial area, corresponding to a transparent area of the terminal protective case, in the two display parts to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if both of the covering detection sensors 4 disposed on the two body parts respectively detect that the body parts are not covered with the terminal protective case, controlling, by the processor 3, the display component 2 to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if both of the covering detection sensors 4 disposed on the two body parts respectively detect that the body parts are covered with the terminal protective case, controlling, by the processor 3, a partial area, corresponding to a transparent area of the terminal protective case, in the two display parts to be on.

An embodiment of this application provides a screen-on control method for a foldable terminal. The foldable terminal includes a body 1, a display component 2, a processor 3, and covering detection sensors 4. The body 1 includes a first body part 101 and a second body part 102 that are connected in a foldable connection manner. The display component 2 includes two display parts, and the two display parts are fastened on the different body parts. The covering detection sensors 4 are disposed on the first body part 101 and the second body part 102. The method includes detecting, by the covering detection sensor 4 disposed on the first body part 101, whether the first body part 101 is covered with a terminal protective case, detecting, by the covering detection sensor 4 disposed on the second body part 102, whether the second body part 102 is covered with a terminal protective case, and when the body 1 is in an unfolded state, if only one of the covering detection sensors 4 disposed on the two body parts detects that a body part on which the covering detection sensor 4 is located is covered with the terminal protective case, controlling, by the processor 3, a display part on a body part that is not covered with the terminal protective case to be on.

The foregoing description is merely an embodiment of this application, but is not intended to limit this application. Any modification, equivalent replacement, or improvement made without departing from the principle of this application should fall within the protection scope of this application.

What is claimed is:

1. A foldable terminal comprising:
    a body comprising:
        a first body part; and
        a second body part coupled to the first body part in a foldable connection manner;
    a display component comprising two display parts fastened on different body parts of the body, wherein the two display parts comprise a to-be-used display part and a not-to-be-used display part;
    a covering detection sensor disposed on the first body part and configured to detect whether the first body part is covered with a terminal protective case; and
    a processor coupled to the display component and the covering detection sensor, wherein when the body is in a folded state, the processor is configured to:
        detect, using the covering detection sensor, that the first body part is not covered with the terminal protective case;
        predict the to-be-used display part based on status data of a user or an operation instruction from the user; and
        control, based on detecting that the first body part is not covered with the terminal protective case, the to-be-used display part to be completely or partially on and the not-to-be-used display part not to be on.

2. The foldable terminal of claim 1, wherein when the to-be-used display part is located on the first body part, the processor is further configured to:
    detect, using the covering detection sensor, that the first body part is not covered with the terminal protective case; and
    control the to-be-used display part to be completely or partially on.

3. The foldable terminal of claim 1, further comprising an angle sensor electrically coupled to the processor and configured to:
    detect an angle value of an included angle between the first body part and the second body part; and
    send the angle value to the processor.

4. The foldable terminal of claim 3, wherein the processor is further configured to:
    receive the angle value from the angle sensor; and
    determine that the body is in an unfolded state when the angle value is greater than a preset angle threshold.

5. The foldable terminal of claim 3, wherein the processor is further configured to:
    receive the angle value from the angle sensor; and
    determine that the body is in the folded state when the angle value is less than or equal to a preset angle threshold.

6. The foldable terminal of claim 1, wherein the processor is further configured to:
    perform, using the covering detection sensor, a magnetic field strength detection to obtain a magnetic field strength;
    determine that the first body part is covered with the terminal protective case when the magnetic field strength is greater than a preset magnetic field strength threshold; and
    determine that the first body part is not covered with the terminal protective case when the magnetic field strength is less than the preset magnetic field strength threshold.

7. The foldable terminal of claim 1, wherein the processor is further configured to:
    perform, using the covering detection sensor, a light intensity detection to obtain a light intensity value;
    determine that the first body part is covered with the terminal protective case when the light intensity value is less than a preset light intensity threshold; and
    determine that the first body part is not covered with the terminal protective case when the light intensity value is greater than the preset light intensity threshold.

8. A foldable terminal comprising:
    a body comprising:
        a first body part; and
        a second body part coupled to the first body part in a foldable connection manner;
    a display component comprising two display parts fastened on different body parts of the body, wherein the two display parts comprise a to-be-used display part and a not-to-be-used display part;
    a covering detection sensor disposed on the first body part and configured to detect whether the first body part is covered with a terminal protective case; and
    a processor coupled to the display component and the covering detection sensor, wherein when the body is in a folded state, the processor is configured to:

detect, using the covering detection sensor, that the first body part is not covered with the terminal protective case; and control, based on detecting that the first body part is not covered with the terminal protective case, the display component to be on and the not-to-be-used display part not to be on.

9. The foldable terminal of claim 8, further comprising an angle sensor electrically coupled to the processor and configured to:

detect an angle value of an included angle between the first body part and the second body part; and send the angle value to the processor.

10. The foldable terminal of claim 9, wherein the processor is further configured to:

receive the angle value from the angle sensor; and determine that the body is in the unfolded state when the angle value is greater than a preset angle threshold.

11. The foldable terminal of claim 9, wherein the processor is further configured to:

receive the angle value from the angle sensor; and determine that the body is in a folded state when the angle value is less than or equal to a preset angle threshold.

12. The foldable terminal of claim 8, wherein the processor is further configured to:

perform, using the covering detection sensor, a magnetic field strength detection to obtain a magnetic field strength;

determine that the first body part is covered with the terminal protective case when the magnetic field strength is greater than a preset magnetic field strength threshold; and determine that the first body part is not covered with the terminal protective case when the magnetic field strength is less than the preset magnetic field strength threshold.

13. The foldable terminal of claim 8, wherein the processor is further configured to:

perform, using the covering detection sensor, a light intensity detection to obtain a light intensity value;

determine that the first body part is covered with the terminal protective case when the light intensity value is less than a preset light intensity threshold; and determine that the first body part is not covered with the terminal protective case when the light intensity value is greater than the preset light intensity threshold.

14. A screen-on control method for a foldable terminal comprising a body, a display component, a processor, and a covering detection sensor, wherein when the body is in a folded state, the screen-on control method comprises:

detecting, using the covering detection sensor, that a first body part of the body is not covered with the terminal protective case;

predicting, based on status data of a user or an operation instruction from the user, a to-be-used display part in two display parts fastened on different body parts of the body; and controlling, based on detecting that the first body part is not covered with the terminal protective case, the to-be-used display part to be completely or partially on and a not-to-be-used display part not to be on.

15. The screen-on control method of claim 14, wherein when the to-be-used display part is located on the first body part, the screen-on control method further comprises:

detecting, using the covering detection sensor, that the first body part is not covered with the terminal protective case; and controlling the to-be-used display part to be completely or partially on.

16. The screen-on control method of claim 14, further comprising:

detecting, by an angle sensor of the foldable terminal, an angle value of an included angle between the first body part and a second body part; and sending, by the angle sensor, the angle value to the processor.

17. The screen-on control method of claim 16, further comprising:

receiving the angle value from the angle sensor; and determining that the body is in an unfolded state when the angle value is greater than a preset angle threshold.

18. The screen-on control method of claim 16, further comprising:

receiving the angle value from the angle sensor; and determining that the body is in the folded state when the angle value is less than or equal to a preset angle threshold.

19. The screen-on control method of claim 14, further comprising:

performing, using the covering detection sensor, a magnetic field strength detection to obtain a magnetic field strength;

determining that the first body part is covered with the terminal protective case when the magnetic field strength is greater than a preset magnetic field strength threshold; and determining that the first body part is not covered with the terminal protective case when the magnetic field strength is less than the preset magnetic field strength threshold.

20. The screen-on control method of claim 14, further comprising:

performing, using the covering detection sensor, a light intensity detection to obtain a light intensity value;

determining that the first body part is covered with the terminal protective case when the light intensity value is less than a preset light intensity threshold; and determining that the first body part is not covered with the terminal protective case when the light intensity value is greater than the preset light intensity threshold.

* * * * *